US008422429B2

(12) United States Patent
Nam et al.

(10) Patent No.: US 8,422,429 B2
(45) Date of Patent: Apr. 16, 2013

(54) METHOD AND SYSTEM FOR INDICATING THE TRANSMISSION MODE FOR UPLINK CONTROL INFORMATION

(75) Inventors: Young-Han Nam, Richardson, TX (US); Jianzhong Zhang, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 140 days.

(21) Appl. No.: 13/096,565

(22) Filed: Apr. 28, 2011

(65) Prior Publication Data

US 2011/0274043 A1 Nov. 10, 2011

Related U.S. Application Data

(60) Provisional application No. 61/331,272, filed on May 4, 2010, provisional application No. 61/350,890, filed on Jun. 2, 2010, provisional application No. 61/354,647, filed on Jun. 14, 2010, provisional application No. 61/355,941, filed on Jun. 17, 2010.

(51) Int. Cl.
*H04W 88/08* (2009.01)

(52) U.S. Cl.
USPC ............ 370/328; 370/329; 370/341; 370/252

(58) Field of Classification Search ................. 370/328, 370/329, 252, 341
See application file for complete search history.

(56) References Cited

U.S. PATENT DOCUMENTS

| 8,072,918 B2 * | 12/2011 | Muharemovic et al. ...... 370/319 |
| 2008/0247375 A1 | 10/2008 | Muharemovic et al. |
| 2009/0190528 A1 * | 7/2009 | Chung et al. ................ 370/328 |
| 2009/0285193 A1 | 11/2009 | Kim et al. |
| 2010/0039953 A1 * | 2/2010 | Zhang ........................ 370/252 |
| 2010/0271970 A1 * | 10/2010 | Pan et al. .................... 370/252 |
| 2011/0141928 A1 * | 6/2011 | Shin et al. ................... 370/252 |
| 2011/0268045 A1 * | 11/2011 | Heo et al. .................... 370/329 |

OTHER PUBLICATIONS

International Search Report dated Dec. 15, 2011 in connection with International Patent Application No. PCT/KR2011/003296.
European Search Report dated Sep. 22, 2011 in connection with European Patent Application No. 11164705.3.
Samsung: "Concurrent PUSCH and PUCCH Transmissions", 3GPP Draft, R1-102175 PUSCH_PUCCH, 3rd Generation Partnership Project (3GPP), Mobile Competence Centre; 650, Route Des Lucioles; F-06921 Sophia-Antipolis Cedex, France, vol. Ran WG1, no. Beijing, China, Apr. 12-16, 2010, pp. 1-3.

(Continued)

*Primary Examiner* — Ricky Ngo
*Assistant Examiner* — Rasheed Gidado

(57) ABSTRACT

A base station includes a transmit path circuitry to select one of a first UCI multiplexing method that allows a subscriber station to simultaneously transmit PUSCH and PUCCH and a second UCI multiplexing method that does not allow the subscriber station to simultaneously transmit PUSCH and PUCCH. The transmit path circuitry also transmits a higher layer signal indicating the one selected UCI multiplexing method, and transmits one or more uplink grants. Each of the uplink grants schedules a PUSCH in an UL CC for a subframe n, and each of the uplink grants carries a CQI request. The base station also includes a receive path circuitry to receive an aperiodic CSI report on the PUSCH in the uplink component carrier i when only one of the uplink grants scheduling a PUSCH in an uplink component carrier i carries a CQI request having a value from a set of values.

32 Claims, 13 Drawing Sheets

OTHER PUBLICATIONS

"3rd Generation Partnership Project; Technical Specification Group Radio Access Network; Evolved Universal Terrestrial Radio Access (E-UTRA); Multiplexing and Channel Coding (Release 9)", 3GPP Standard, 3GPP TS 36.212, 3rd Generation Partnership Project (3GPP), Mobile Competence Centre; 650, Rouge des Lucioles; F-06921 Sophia-Antipolis Cedex; France, no. vol. 1.0, Mar. 30, 2010, pp. 1-61.

Samsung: "Further Discussion on Data and Control Multiplexing in UL MIMO Transmissions", 3GPP Draft; R1-103675 UL MIMO UCI and PUSCH MUX, 3rd Generation Partnership Project (3GPP), Mobile Competence Centre; 650, Route des Lucioles; F-06921 Sophia-Antipoles Cedex; France, vol. RAN WG1, no. Dresden, Germany; Jun. 28-Jul. 2, 2010; pp. 1-6.

* cited by examiner

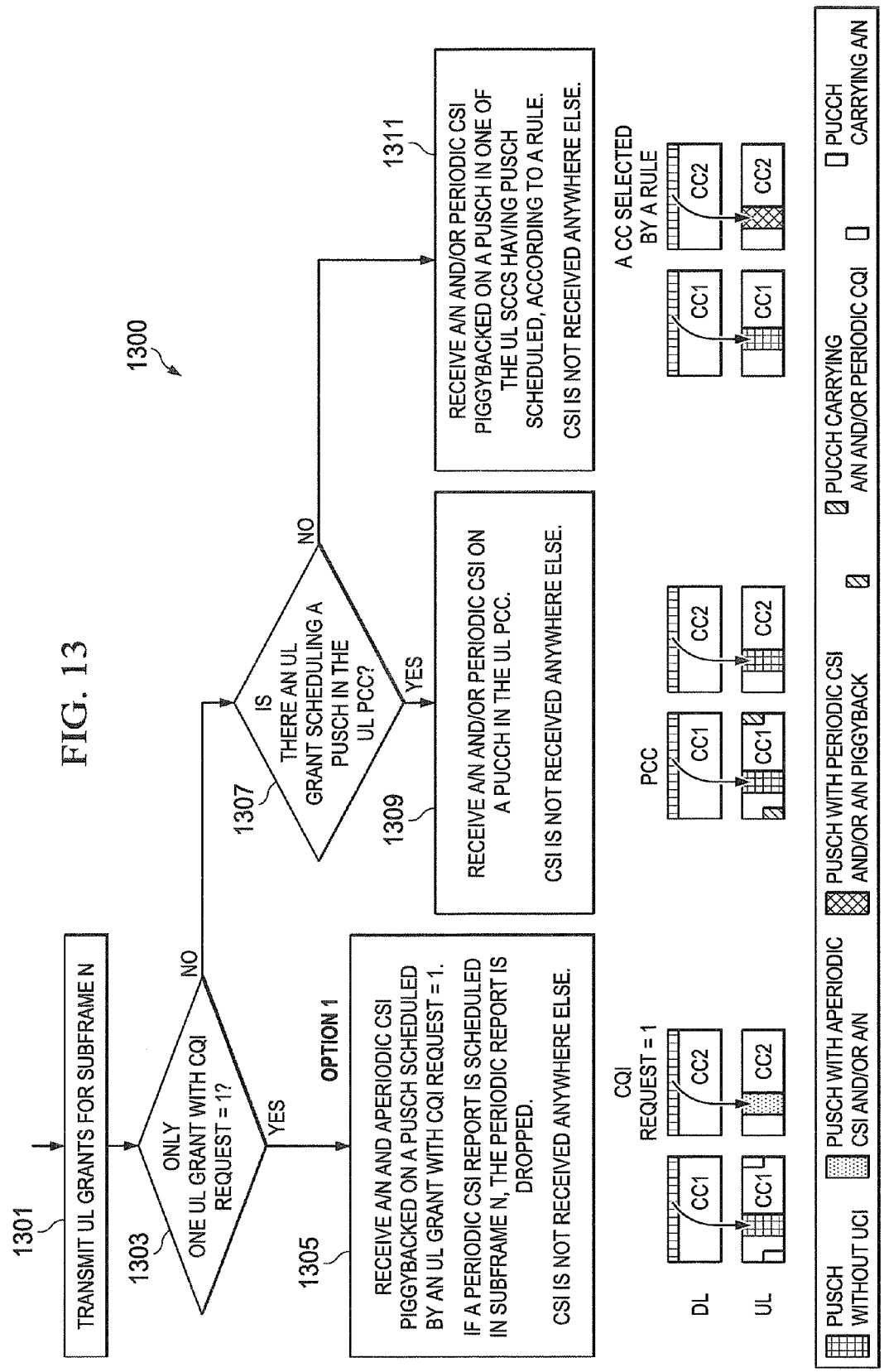

US 8,422,429 B2

METHOD AND SYSTEM FOR INDICATING THE TRANSMISSION MODE FOR UPLINK CONTROL INFORMATION

CROSS-REFERENCE TO RELATED APPLICATION(S) AND CLAIM OF PRIORITY

The present application is related to U.S. Provisional Patent Application No. 61/331,272, filed May 4, 2010, entitled "MULTIPLEXING OF CONTROL AND DATA IN CARRIER AGGREGATED SYSTEM", U.S. Provisional Patent Application No. 61/350,890, filed Jun. 2, 2010, entitled "MULTIPLEXING OF CONTROL AND DATA IN UPLINK TRANSMISSIONS IN CARRIER AGGREGATED SYSTEM", U.S. Provisional Patent Application No. 61/354,647, filed Jun. 14, 2010, entitled "MULTIPLEXING OF CONTROL AND DATA IN UPLINK TRANSMISSIONS IN CARRIER AGGREGATED SYSTEM", and U.S. Provisional Patent Application No. 61/355,941, filed Jun. 17, 2010, entitled "MULTIPLEXING OF CONTROL AND DATA IN UPLINK MIMO TRANSMISSIONS IN CARRIER AGGREGATED SYSTEM". Provisional Patent Application Nos. 61/331,272; 61/350,890; 61/354,647; and 61/355,941 are assigned to the assignee of the present application and are hereby incorporated by reference into the present application as if fully set forth herein. The present application hereby claims priority under 35 U.S.C. §119(e) to U.S. Provisional Patent Application Nos. 61/331,272; 61/350,890; 61/354,647; and 61/355,941.

TECHNICAL FIELD OF THE INVENTION

The present application relates generally to wireless communications and, more specifically, to a method and system for transmitting uplink control information.

BACKGROUND OF THE INVENTION

In 3$^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station includes a transmit path circuitry configured to select one of a first uplink control information (UCI) multiplexing method that allows a subscriber station to simultaneously transmit physical uplink shared channel (PUSCH) and physical uplink control channel (PUCCH) and a second UCI multiplexing method that does not allow the subscriber station to simultaneously transmit PUSCH and PUCCH. The transmit path circuitry also is configured to transmit a higher layer signal indicating the one selected UCI multiplexing method to the subscriber station, and transmit one or more uplink grants to the subscriber station. Each of the one or more uplink grants schedules a PUSCH in an uplink component carrier (UL CC) for a subframe n to the subscriber station, and each of the one or more uplink grants carries a channel quality information (CQI) request. The base station also includes a receive path circuitry configured to receive an aperiodic channel state information (CSI) report transmitted by the subscriber station on the PUSCH in the uplink component carrier i when only one uplink grant of the one or more uplink grants scheduling a PUSCH in an uplink component carrier i carries a CQI request having a value from a set of values. When acknowledgement/negative acknowledgement (ACK/NACK) information is scheduled in the same subframe n and when the one selected UCI multiplexing method is the first UCI multiplexing method, the ACK/NACK information is also transmitted by the subscriber station on the PUSCH transmitted in the uplink component carrier i.

A method of operating a base station is provided. The method includes selecting one of a first uplink control information (UCI) multiplexing method that allows a subscriber station to simultaneously transmit physical uplink shared channel (PUSCH) and physical uplink control channel (PUCCH) and a second UCI multiplexing method that does not allow the subscriber station to simultaneously transmit PUSCH and PUCCH. The method also includes transmitting a higher layer signal indicating the one selected UCI multiplexing method to the subscriber station, and transmitting one or more uplink grants to the subscriber station. Each of the one or more uplink grants schedules a PUSCH in an uplink component carrier (UL CC) for a subframe n to the subscriber station, and each of the one or more uplink grants carries a channel quality information (CQI) request. The method further includes receiving an aperiodic channel state information (CSI) report on the PUSCH transmitted by the subscriber station in the uplink component carrier i when only one uplink grant of the one or more uplink grants scheduling a PUSCH in an uplink component carrier i carries a CQI request having a value from a set of values. When acknowledgement/negative acknowledgement (ACK/NACK) information is scheduled in the same subframe n and when the one selected UCI multiplexing method is the first UCI multiplexing method, the ACK/NACK information is also transmitted by the subscriber station on the PUSCH transmitted in the uplink component carrier i.

A subscriber station is provided. The subscriber station includes a receive path circuitry configured to receive a higher layer signal from a base station indicating one of a first uplink control information (UCI) multiplexing method that allows a subscriber station to simultaneously transmit physical uplink shared channel (PUSCH) and physical uplink control channel (PUCCH) and a second UCI multiplexing method that does not allow the subscriber station to simultaneously transmit PUSCH and PUCCH. The receive path circuitry also is configured to receive one or more uplink grants from the base station. Each of the one or more uplink grants schedules a physical uplink shared channel (PUSCH) in an uplink component carrier (UL CC) for a subframe n to the subscriber station, and each of the one or more uplink grants carries a channel quality information (CQI) request. The subscriber station also includes a transmit path circuitry configured to transmit an aperiodic channel state information (CSI) report to the base station on the PUSCH in the uplink component carrier i when only one uplink grant of the one or more uplink grants scheduling a PUSCH in an uplink component carrier i carries a CQI request having a value from a set of values. When acknowledgement/negative acknowledgement (ACK/NACK) information is scheduled in the same subframe n and when the one selected UCI multiplexing method is the first UCI multiplexing method, the ACK/NACK information is also transmitted to the base station on the PUSCH transmitted in the uplink component carrier i.

A method of operating a subscriber station is provided. The method includes receiving a higher layer signal from a base station indicating one of a first uplink control information (UCI) multiplexing method that allows the subscriber station to simultaneously transmit physical uplink shared channel (PUSCH) and physical uplink control channel (PUCCH) and a second UCI multiplexing method that does not allow the subscriber station to simultaneously transmit PUSCH and PUCCH. The method also includes receiving one or more uplink grants from the base station. Each of the one or more uplink grants schedules a physical uplink shared channel (PUSCH) in an uplink component carrier (UL CC) for a subframe n to the subscriber station, and each of the one or more uplink grants carries a channel quality information (CQI) request. The method further includes transmitting an aperiodic channel state information (CSI) report on the PUSCH to the base station in the uplink component carrier i when only one uplink grant of the one or more uplink grants scheduling a PUSCH in an uplink component carrier i carries a CQI request having a value from a set of values. When acknowledgement/negative acknowledgement (ACK/NACK) information is scheduled in the same subframe n and when the one selected UCI multiplexing method is the first UCI multiplexing method, the ACK/NACK information is also transmitted by the subscriber station on the PUSCH transmitted in the uplink component carrier i.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates a method of operating an eNodeB or base station according to another embodiment of this disclosure.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE terms "node B", "enhanced node B", and "eNodeB" are other terms for "base station" used below. Also, the LTE term "user equipment" or "UE" is another term for "subscriber station" used below.

Figure 1:
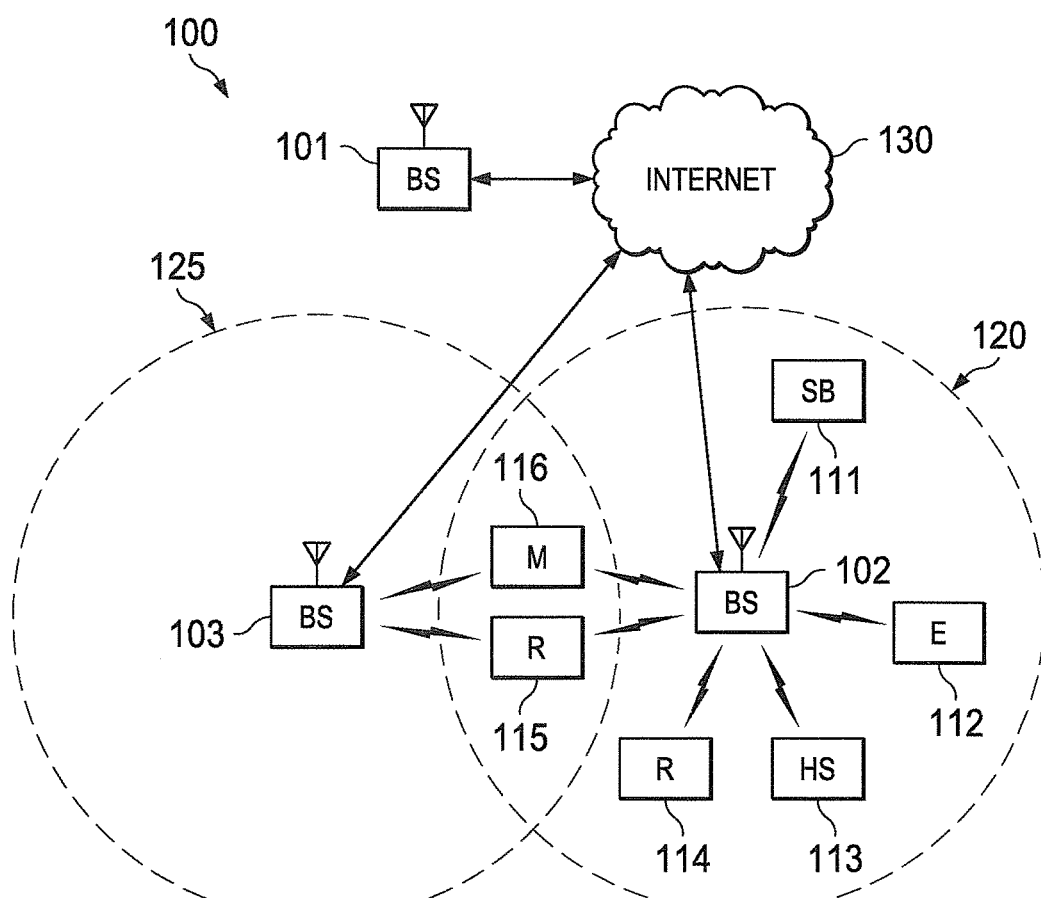
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
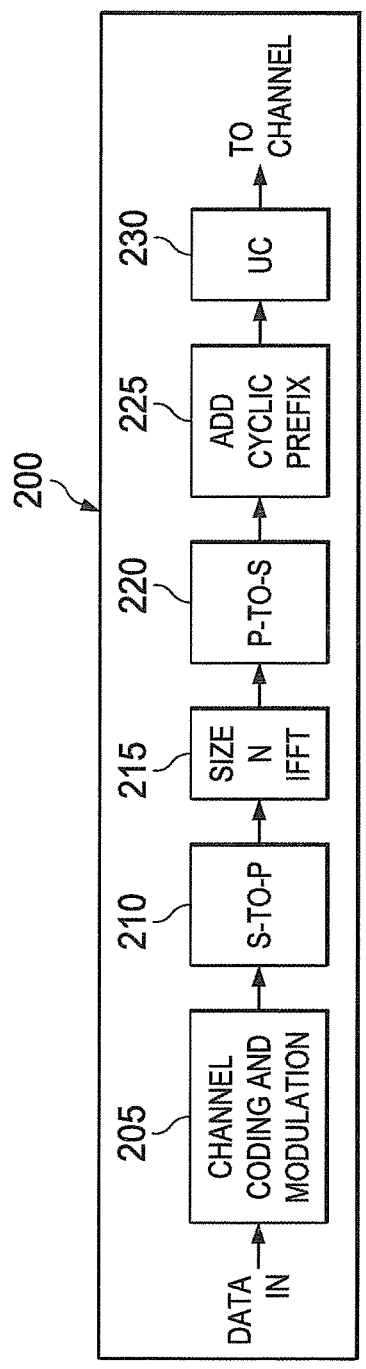
FIG. 2 is a high-level diagram of an orthogonal frequency division multiple access (OFDMA) transmitter according to one embodiment of this disclosure.
Figure 3:
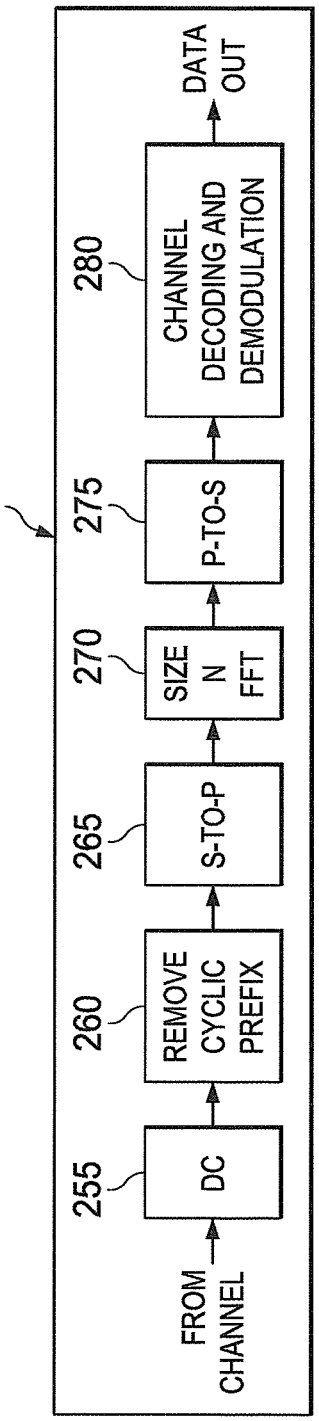
FIG. 3 is a high-level diagram of an OFDMA receiver according to one embodiment of this disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL} N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where k=0, ..., $N_{RB}^{DL}N_{sc}^{RB}-1$ and l=0, ..., $N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
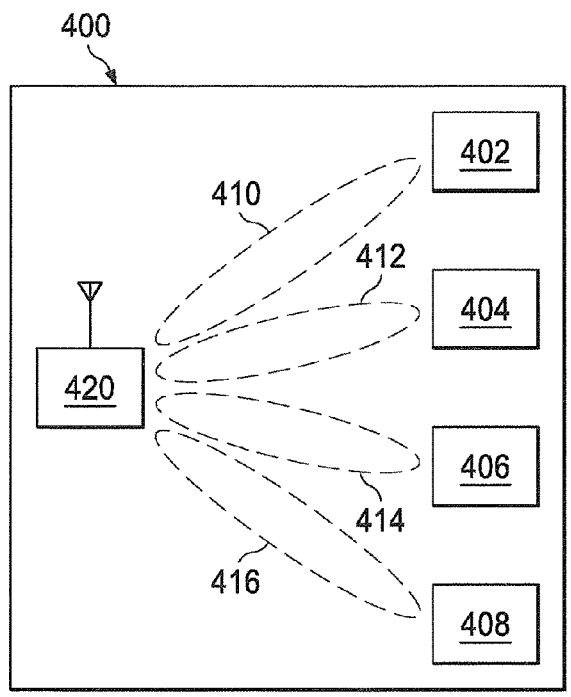
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5A:
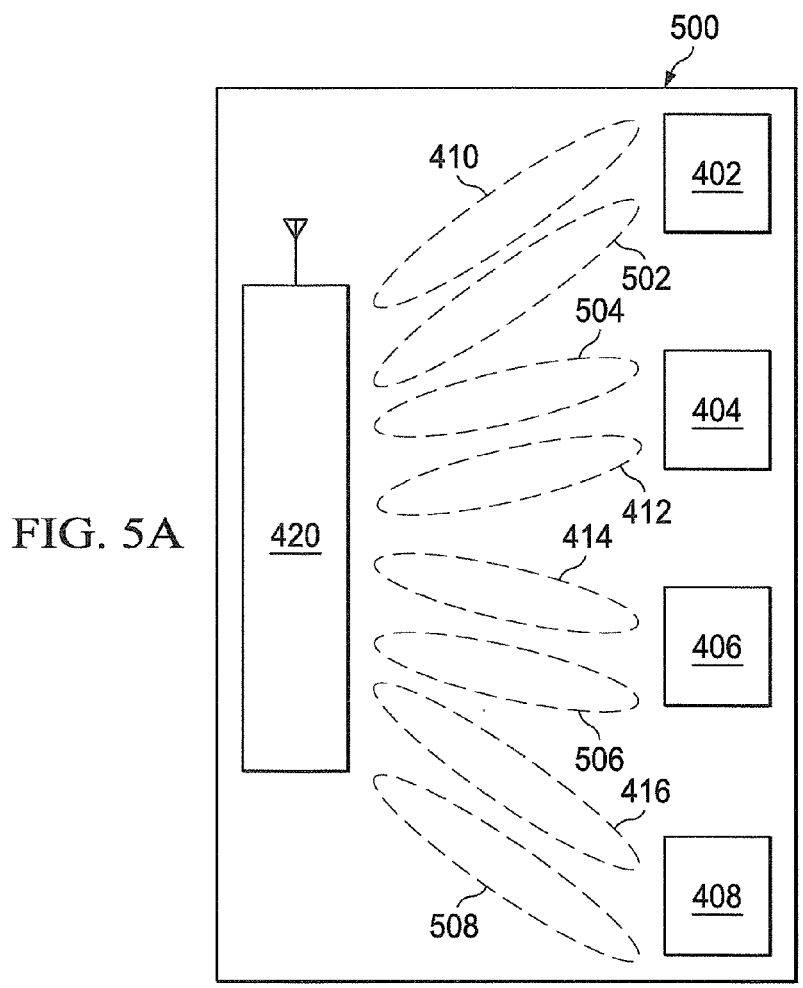
FIG. 5A illustrates a spatial division multiple access (SDMA) scheme according to an embodiment of this disclosure.

FIG. 5A illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

In 3GPP LTE-A Rel-10, UL MIMO spatial multiplexing (SM) is introduced. When a UE is scheduled to transmit signals in a subframe using an UL-MIMO SM scheme in LTE-A, the UE can transmit up to two codewords (CWs) in the subframe.

When two CWs are to be transmitted in a subframe, two bit-streams $h^{(1)}$ and $h^{(2)}$ for the two CWs are separately generated, where $h^{(q)}=[h_0^{(q)}, h_1^{(q)}, \ldots, h_{H+Q_{RI}-1}^{(q)}]$, where q $\in\{1,2\}$. The two inputs from the coding steps separately go through scrambling and modulation mapping. The output of a modulation mapping block is a CW. Up to two CWs are input to a CW-to-layer mapping block whose outputs are layers, which are L modulation symbol streams. Then, each of the L modulation symbol streams is input to a transform (or discrete Fourier transform (DFT)) precoder, and the outputs of the DFT precoders are input to a transmit precoding block. The transmit precoding block generates $N_t$ modulation symbols streams, each of which will be transmitted in a transmit antenna port.

One of the key component of this uplink transmission is the data/control multiplexing function.

Figure 5B:
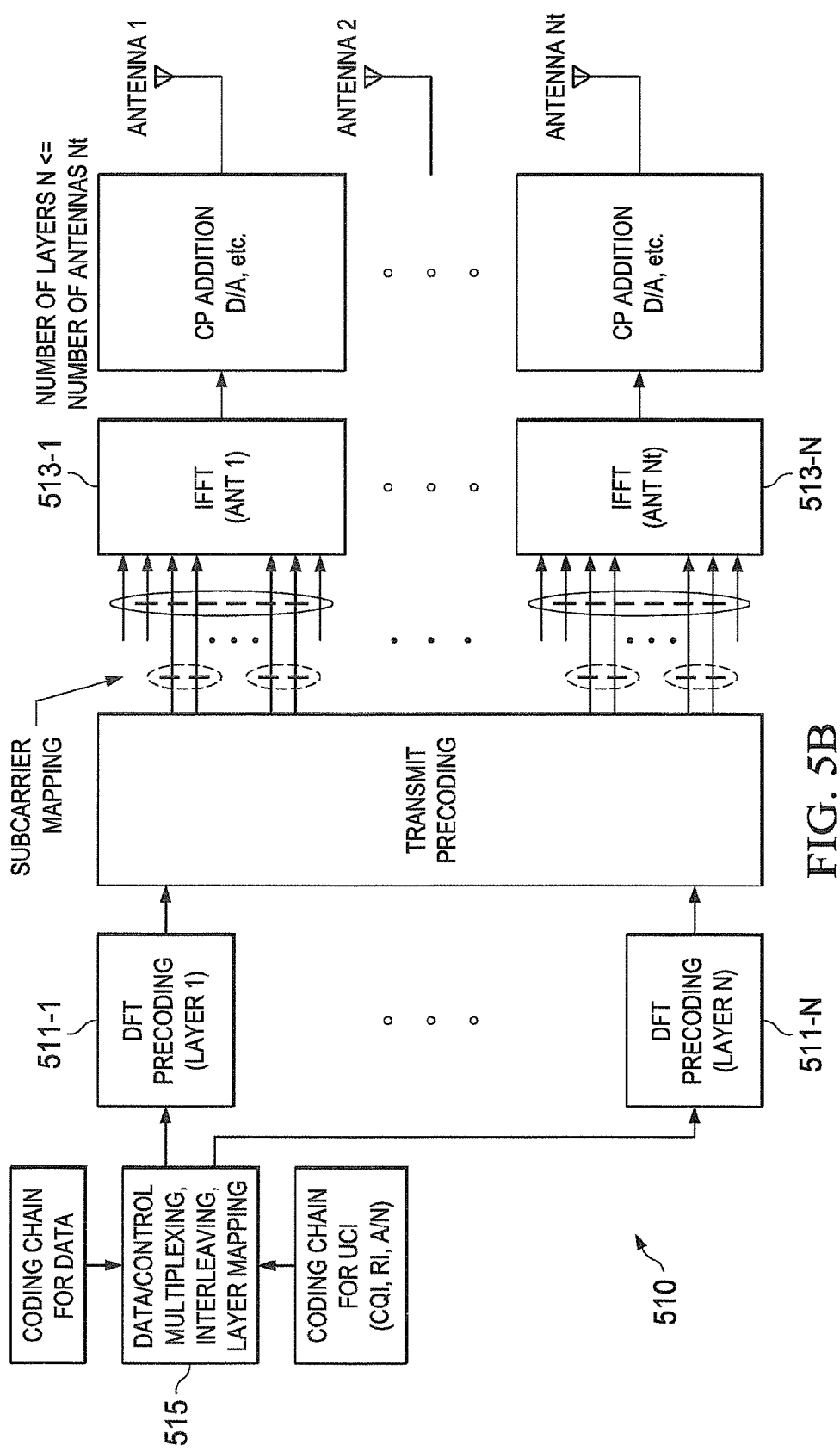
FIG. 5B illustrates a physical uplink shared channel (PUSCH) transmission chain according to an embodiment of this disclosure.

FIG. 5B illustrates a physical uplink shared channel (PUSCH) transmission chain 510 according to an embodiment of this disclosure.

FIG. 5B illustrates an N layer transmission on an Nt transmit antenna UE. FIG. 5B illustrates the mapping of the outputs of N Discrete Fourier Transform (DFT) precoding units 511-1 to 511-N to a contiguous set of subcarriers at inverse fast Fourier transform (IFFT) units 513-1 to 513-N.

One of the key components of the PUSCH transmission chain 510 is the data/control multiplexing function implemented in a data/control multiplexing unit 515, which is fully specified in 3GPP TS 36.212 v 8.5.0, "E-UTRA, Multiplexing and Channel Coding", December 2008, which is hereby incorporated by reference into the present application as if fully set forth herein.

$$Q' = \min\left(\left\lceil \frac{O \cdot M_{sc}^{PUSCH} \cdot N_{symb}^{PUSCH} \cdot \beta_{offset}^{PUSCH} \cdot N}{\sum_{n=1}^{N} \sum_{r=0}^{C(n)-1} K_{r,n}} \right\rceil, 4 \cdot M_{sc}^{PUSCH-current}\right), \quad \text{[Eqn. 1]}$$

The layer mapping is performed before DFT precoding, so that the data and control information are properly multiplexed and interleaved. The transmit precoding is performed between the DFT precoding units 511-1 to 511-N and the IFFT unit 513 to transform, on a per-subcarrier basic, an N dimension signal at the output of the DFT precoding units the CQI, RI and A/N. Such an embodiment could be suitable for situations where techniques such as layer mixing/layer permutation are used to ensure the same channel quality and, therefore, the same MCS values on all the layers.

This selection of a layer could also be explicitly signaled in the uplink scheduling grant as an additional control field, using either downlink control information (DCI) format 0 or some other uplink grant DCI format.

In addition, the sizes of the three control regions (CQI, RI, A/N) are determined as a function of the corresponding UCI uplink control information (UCI) size, the MCS value associated with the layer on which the control regions are transmitted, and a higher layer signaled offset. The exact calculation of control region sizes is similar to what has already specified in 3GPP LTE standard 3GPP TS 36.212 v 8.5.0, "E-UTRA, Multiplexing and Channel Coding", December 2008, which is hereby incorporated by reference into the present application as if fully set forth herein.

For example, if a single CW solution is used in the UL MIMO with layer permutation/mixing, meaning all the layers will have the same MCS, then the control region equation for hybrid automatic repeat request (HARQ) and rank indication (RI) bits in section 5.2.2.6 of 3GPP LTE standard 3GPP TS 36.212 v 8.5.0, "E-UTRA, Multiplexing and Channel coding", December 2008 can be amended as shown in Equation 1 below:

Note the inclusion of the factor "N", which denotes the number of layers, in the numerator. The sum in the denominator will be over all code blocks (CBs) in all layers. Here C(n) denotes the number of CBs in layer n, and $K_{r,n}$ denotes the size of the rth CB in layer n. Similarly the control region equation for CQI bits is shown in Equation 2 below:

$$Q' = \min\left(\left\lceil \frac{(O+L) \cdot M_{sc}^{PUSCH} \cdot N_{symb}^{PUSCH} \cdot \beta_{offset}^{PUSCH} \cdot N}{\sum_{n=1}^{N} \sum_{r=0}^{C(n)-1} K_{r,n}} \right\rceil, M_{sc}^{PUSCH-current} \cdot N_{symb}^{PUSCH-current} \frac{Q_{RI}}{Q_m}\right). \quad \text{[Eqn. 2.]}$$

511-1 to 511-N to an Nt dimensional signal as an input to the IFFT units 513-1 to 513-N. The subcarrier mapping at the input of the IFFT units 513-1 to 513-N can include non-contiguous segments of subcarriers.

In an embodiment of this disclosure, all the uplink control information (including CQI, RI and A/N bits) is carried on only one of the layers, with the following ways of choosing a particular layer for carrying the uplink control information. The total number of transmission layers is denoted as N.

If the modulation and coding scheme (MCS) used by the N layers are different, the layer that has the largest MCS value is selected to carry the uplink control information such as CQI, RI and A/N. The MCS values are typically carried in the UL schedule assignment grant (sent by the eNodeB to the UE) and, therefore, are known at the UE at the time of this data and control transmission. The control region size is defined as the number of resource elements.

If the MCS used by the N layers is the same, then the first layer is select to carry the uplink control information such as In another embodiment, if the MCS on the layers are different and the pth layer is selected to be the layer on which UCI is transmitted, then Equations 1 and 2 can be amended as shown in Equations 3 and 4, respectively, below:

$$Q' = \min\left(\left\lceil \frac{O \cdot M_{sc}^{PUSCH} \cdot N_{symb}^{PUSCH} \cdot \beta_{offset}^{PUSCH}}{\sum_{r=0}^{C(p)-1} K_{r,p}} \right\rceil, 4 \cdot M_{sc}^{PUSCH-current}\right), \quad \text{[Eqn. 3]}$$

for RI and A/N bits and $$Q' = \min\left(\left\lceil \frac{(O+L) \cdot M_{sc}^{PUSCH} \cdot N_{symb}^{PUSCH} \cdot \beta_{offset}^{PUSCH}}{\sum_{r=0}^{C(p)-1} K_{r,p}} \right\rceil, M_{sc}^{PUSCH-current} \cdot N_{symb}^{PUSCH-current} - \frac{Q_{RI}}{Q_m}\right). \quad [\text{Eqn. 4}]$$

for CQI bits.

In some embodiments of this disclosure, the uplink control information is mapped/allocated onto a subset of the N layers being transmitted on the uplink in a MIMO uplink subframe. The size of the subset, Ns, could be less than or equal to the total number of layers, which is denoted by N.

If the subset size Ns is less than N, i.e, Ns<N, then the layers used for uplink control transmission could be known at the UE according to one of the following methods.

For example, the subset of layers used for uplink control information could also be explicitly signaled in the uplink scheduling grant as an additional control field, using either DCI format 0 or some other uplink grant DCI format.

suitable for situations where techniques such as layer mixing/layer permutation are used to ensure the same channel quality and, therefore, the same MCS values on all the layers.

Case 2. If the active layers have different MCS in their transmissions, then two alternatives apply.

Case 2a. For each active layer, a per-layer control region size is determined according to the UCI size and the MCS on that particular layer. The total size of the control region is the sum of the per-layer control region sizes over the active layers. The control information is then distributed to the active layers according to the per-layer control region size.

For case 2a, one example of determining the overall control region size can be given by amending Equations 1 and 2 as shown in Equations 5 and 6, respectively, below:

$$Q'(n) = \min\left(\left\lceil \frac{O \cdot M_{sc}^{PUSCH} \cdot N_{symb}^{PUSCH} \cdot \beta_{offset}^{PUSCH}}{\sum_{r=0}^{C(n)-1} K_{r,n}} \right\rceil, 4 \cdot M_{sc}^{PUSCH-current}\right), \quad [\text{Eqn. 5}]$$

In another example, the subset of layers could be implicitly inferred by the UE according to (1) number of codewords; (2) codeword to layer mapping structure; and (3) the codeword that uses highest MCS value. For example, if N=4 and layer 1,2 are used for codeword 1 transmission while layer 3,4 are used for codeword 2 transmission, and if the MCS used by for n=1, . . . Ns, where Q'(n) is the number of RI and A/N symbols in the nth active layer.

$$Q'(n) = \min\left(\left\lceil \frac{(O+L) \cdot M_{sc}^{PUSCH} \cdot N_{symb}^{PUSCH} \cdot \beta_{offset}^{PUSCH}}{\sum_{r=0}^{C(n)-1} K_{r,n}} \right\rceil, M_{sc}^{PUSCH-current} \cdot N_{symb}^{PUSCH-current} \frac{Q_{RI}(n)}{Q_m}\right), \quad [\text{Eqn. 6}]$$

codeword 1 is better than the MCS used by codeword 2, then the UE can decide to transmit UL control information on layers 1&2, which corresponds to the layers with the better MCS.

In particular embodiments, the determination of the uplink control regions follows one of the following rules. Note that the subset of layers that contain control information is denoted as active layers.

Case 1. If the active layers used for UL control transmission have the same MCS, then the total size of each control region (CQI, RI, A/N) across the active layers is determined as a function of the corresponding UCI size and this single MCS value, and the control information is distributed evenly across the active layers, where each layer gets roughly 1/Ns of the total control region size. Such an embodiment could be where Q'(n) is the number of CQI symbols in the nth active layer, and $Q_{RI}(n)$ is the number of RI symbols allocated on this active layer.

Case 2b. The size of the total control region is jointly determined as a function of the UCI size and the MCSs on all active layers, and the control information is distributed evenly across all the active layers, where each layer gets roughly 1/Ns of the total control region size.

For both case 1 and case 2b, one example of determining the overall control region size can be given by amending Equations 1 and 2 as shown in Equations 7 and 8, respectively, below:

$$Q' = \min\left(\left\lceil \frac{O \cdot M_{sc}^{PUSCH} \cdot N_{symb}^{PUSCH} \cdot \beta_{offset}^{PUSCH} \cdot Ns}{\sum_{n=1}^{N} \sum_{r=0}^{C(n)-1} K_{r,n}} \right\rceil, 4 \cdot M_{sc}^{PUSCH-current} \cdot Ns\right), \quad [\text{Eqn. 7}]$$

for RI and A/N bits. Note the first summation on the denominator is summed over all active layers.

$$Q' = \min\left(\left\lceil \frac{(O+L) \cdot M_{sc}^{PUSCH} \cdot N_{symb}^{PUSCH} \cdot \beta_{offset}^{PUSCH} \cdot Ns}{\sum_{n=1}^{N} \sum_{r=0}^{C(n)-1} K_{r,n}} \right\rceil, M_{sc}^{PUSCH-current} \cdot N_{symb}^{PUSCH-current} \cdot Ns - \frac{Q_{RI}}{Q_m} \right),$$  [Eqn. 8]

for CQI bits.

Furthermore, the UCI symbols can be ensured to be evenly distributed across all active layers. Let $$Q'' = Ns \cdot \left\lceil \frac{Q'}{Ns} \right\rceil,$$

and use Q" as the total number of UCI symbols. A total of Q"-Q' null filler symbols are added to ensure the correctness of rate matching.

In the current LTE specification, an eNodeB and a UE exchange physical signals associated with a HARQ process.

For DL transmission to a UE, an eNodeB transmits a DL transmission grant to a UE containing a HARQ ID number #n in a subframe. In the same subframe, the eNodeB also transmits up to two packets (or transport blocks (TBs)) for the HARQ process to the UE. Four subframes later, the UE sends an acknowledgement of the packets in HARQ process #n back to the eNodeB. The acknowledgement signal contains up to two bits for the two packets, and each bit indicates the decoding result at the UE. If the UE successfully decodes a packet, the acknowledgement signal will have an acknowledgement (ACK) bit for the packet. Otherwise, the acknowledgement signal will have a negative acknowledgement (NACK) bit for the packet. If a NACK is received for a packet, the eNodeB sends a transmission grant containing a HARQ ID #n and a retransmission packet for the HARQ process to the UE in a subframe that is a few subframes later than the subframe in which the UE received a NACK.

For UL transmission to a UE, an eNodeB transmits an UL transmission grant to the UE containing HARQ ID number #n in a subframe. Four subframes later, the UE transmits a packet for the HARQ process to the eNodeB. Four subframes later, the eNodeB sends an acknowledgement of the packet in HARQ process #n back to the UE. If the eNodeB successfully decodes the packet, the eNodeB sends back an ACK. Otherwise, the eNodeB sends back a NACK to the UE. If a NACK is received, the UE retransmits the packet for the HARQ process to the eNodeB in a subframe that is four subframes later than the subframe in which the UE received a NACK.

A physical downlink control channel (PDCCH) that carries DCI is transmitted on an aggregation of one or more consecutive control channel elements (CCEs). The CCEs available in the DL carrier are numbered from 0 to $N_{CCE}-1$.

In the LTE system, the physical uplink control channel (PUCCH) is further divided into multiple regions: CQI region, persistent-ACK/NACK and scheduling request region (P-ACK/SR) and dynamic ACK/NACK region (D-ACK). A CQI resource is uniquely identified by its resource pair, i.e., a cyclic shift (CS) index and a resource block (RB) index. On the other hand, a P-ACK/SR or a D-ACK resource is uniquely identified by its resource triple, i.e., a CS index, and orthogonal cover (OC) index and a RB index.

A D-ACK is mapped to a PUCCH AN resource triple from an index $n_{PUCCH}^{(1)}$.

In summary, in the LTE system, there is a one-to-one mapping function from a CCE index in subframe n, to a PUCCH AN resource triple in subframe n-k.

This disclosure provides systems and methods for simultaneously transmitting data and control information such as CQI (channel quality information), RI (rank information), A/N (ACK/NACK information) in UL carrier aggregated systems. Note that all three types of uplink control information are also generally denoted as UCI.

UL carrier aggregated systems where A/N is scheduled in subframe n according to Rel-8 LTE procedure to acknowledge a DL PDSCH transmission that occurred in subframe n-k are considered. In such systems, the physical downlink shared channel (PDSCH) may have been transmitted in one or more DL carriers in subframe n-k. The number of information bits that the A/N carries is denoted by $N_{AN}$, where $N_{AN}$ is a positive integer.

Figure 6A:
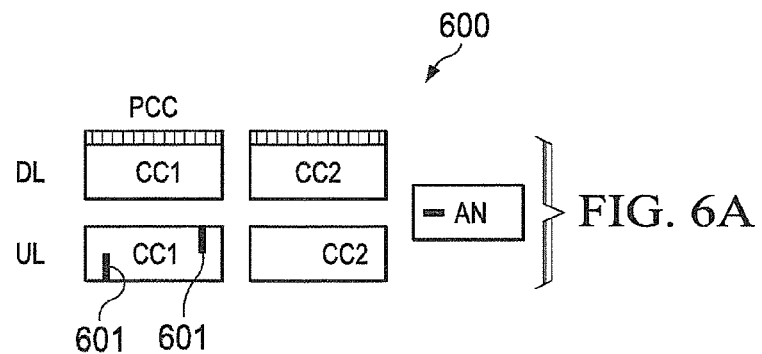
FIG. 6A illustrates an A/N transmission in a subframe in which no physical uplink shared channel (PUSCH) is scheduled according to an embodiment of this disclosure.

FIG. 6A illustrates an A/N transmission 600 in a subframe in which no physical uplink shared channel (PUSCH) is scheduled according to an embodiment of this disclosure.

Without an UL PUSCH transmission scheduled in subframe n, A/N is transmitted in an UL channel in the subframe. In this case, the UL channel can be PUCCH format 1, PUCCH format 2, a new PUCCH format of DFT-s-OFDM, or PUSCH. For example, as shown in FIG. 6A, the A/N 601 is transmitted in PUCCH on a RB located close to one band edge in the first slot of subframe n, and on another RB located close to the other band edge in the first slot of subframe n in the UL primary component carrier (PCC).

Figure 6B:
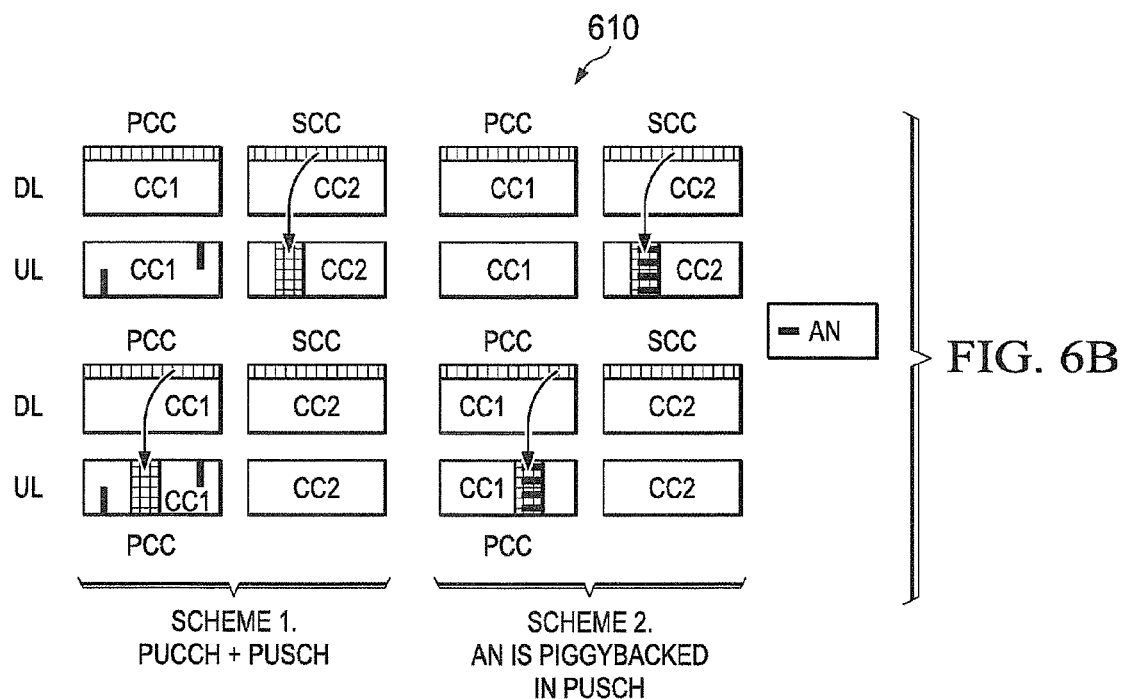
FIG. 6B illustrates an A/N transmission in subframes where physical uplink shared channel (PUSCH) is scheduled in one uplink component carrier (UL CC) according to an embodiment of this disclosure.

FIG. 6B illustrates an A/N transmission 610 in subframes where physical uplink shared channel (PUSCH) is scheduled in one uplink component carrier (UL CC) according to an embodiment of this disclosure.

With UL PUSCH transmission scheduled in one UL CC in subframe n, two methods of multiplexing UL data and A/N can be considered as shown in FIG. 6B. In one scheme (denoted as AN multiplexing scheme 1), A/N is transmitted in the PUCCH in the PCC, while UL data is transmitted in the PUSCH in the scheduled UL CC, if any. In another scheme (denoted as AN multiplexing scheme 2), A/N is piggybacked in the PUSCH in the scheduled UL CC. In particular embodiments, A/N is piggybacked in the PUSCH according to methods proposed in U.S. Provisional Patent No. 61/206,455, entitled "Uplink Data And Control Signal Transmission in MIMO Wireless Systems", filed Jan. 30, 2009, and U.S. patent application Ser. No. 12/641,951, entitled "System And Method For Uplink Data And Control Signal Transmission In MIMO Wireless Systems", filed Dec. 18, 2009, both of which are hereby incorporated by reference into the present application as if fully set forth herein.

Figure 6C:
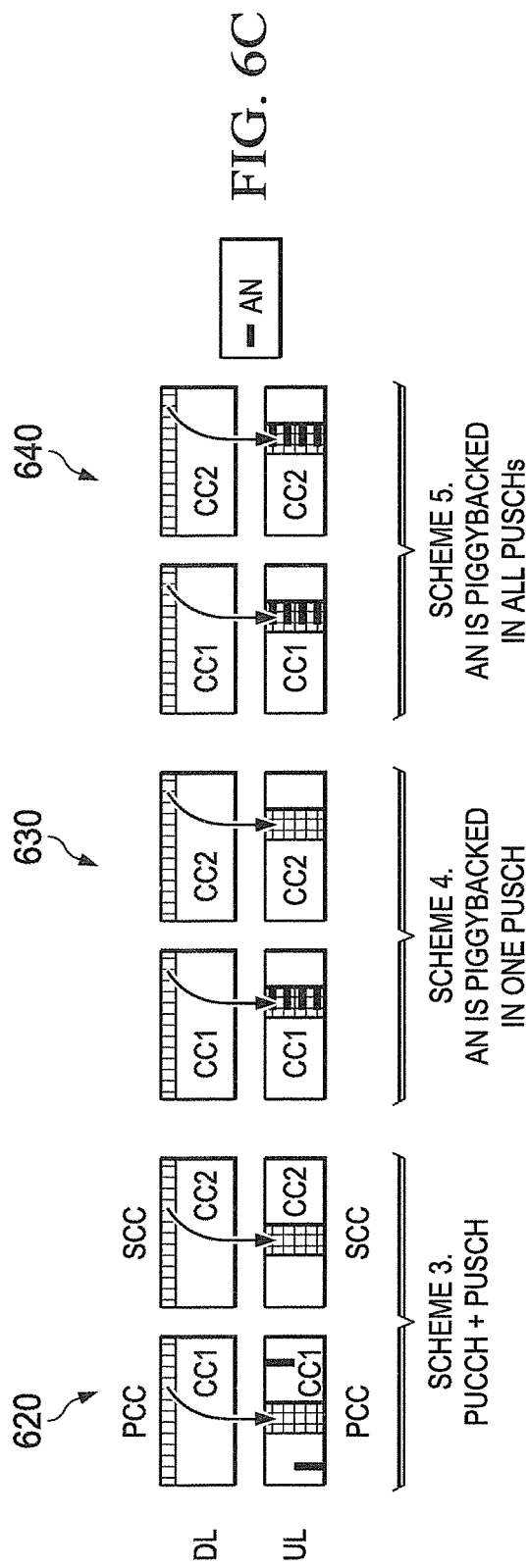
FIG. 6C illustrates A/N transmission schemes in subframes where physical uplink shared channel (PUSCH) is scheduled in more than one component carrier according to an embodiment of this disclosure.

FIG. 6C illustrates A/N transmission schemes in subframes where physical uplink shared channel (PUSCH) is scheduled in more than one component carrier according to an embodiment of this disclosure.

When UL PUSCH transmission is scheduled in more than one UL CC in subframe n, three methods of multiplexing UL data and A/N can be considered. In one scheme 620 (AN multiplexing scheme 3) shown in FIG. 6C, A/N is transmitted in the PUCCH in the PCC, while UL data is transmitted in the PUSCH in the scheduled UL CCs. In another scheme 630 (denoted as AN multiplexing scheme 4), A/N is piggybacked in the PUSCH in one of the scheduled UL CCs, where A/N is piggybacked on the PUSCH in the one CC according to methods proposed in U.S. Provisional Patent No. 61/206,455 and U.S. patent application Ser. No. 12/641,951. In another scheme 640 (denoted by AN multiplexing scheme 5), A/N is piggybacked in the PUSCHs in all the scheduled UL CCs, where A/N is piggybacked on the PUSCH in each CC according to methods proposed in U.S. Provisional Patent No. 61/206,455 and U.S. patent application Ser. No. 12/641,951.

It is noted that AN multiplexing scheme 3 becomes identical to AN multiplexing scheme 1 when the PUSCH is scheduled in only one UL CC. In addition, AN multiplexing schemes 4 and 5 become identical to AN multiplexing scheme 2 when the PUSCH is scheduled in only one UL CC.

In AN multiplexing scheme 4, the one CC whose PUSCH would piggyback the A/N is selected by a rule. Some example rules are: (1) the CC scheduled PUSCH with the highest MCS among the UL CCs scheduled PUSCH in subframe n is selected, (2) the CC with the lowest CC-ID among the UL CCs scheduled PUSCH in subframe n is selected, or (3) the CC with the lowest physical cell ID (PCID) among the UL CCs scheduled PUSCH in subframe n is selected.

In an embodiment of this disclosure, when a UE receives one or more UL grants that schedule PUSCH in one or more UL CCs in subframe n, the UE transmits A/N in subframe n utilizing one fixed scheme. On the other hand, when the UE receives no UL grants, the UE transmits A/N in the PUCCH in the UL PCC. For example, the one fixed A/N transmission scheme used when PUSCH is scheduled in one or more UL CCs in subframe n can be A/N multiplexing scheme 1, scheme 2, scheme 3, scheme 4, or scheme 5.

In one example, the one A/N transmission scheme used when PUSCH is scheduled in one or more UL CCs in subframe n is A/N multiplexing scheme 1 or 3 that transmits the PUSCH and PUCCH simultaneously. In this case, in order to detect A/N from the UE, the eNodeB only needs to detect signals in the PUCCH in the PCC. Hence, the eNodeB implementation would be simpler when this scheme is selected. However, the UE may suffer from increased peak-to-average power ratio (PAPR) as the UE transmits multiple UL channels simultaneously.

In another example, the one A/N transmission scheme used when the PUSCH is scheduled in one or more UL CCs in subframe n is A/N multiplexing scheme 2 or 5 that piggybacks A/N in all the scheduled PUSCHs in subframe n. In this case, in order to detect A/N from the UE, the eNodeB performs hypothesis testing between two hypotheses: (1) A/N is conveyed in the PUCCH in the PCC and (2) A/N is piggybacked in the PUSCHs in all the UL CCs. Hence, the eNodeB implementation would be slightly more complicated when this scheme is selected. However, the UE may benefit from decreased peak-to-average power ratio (PAPR).

In an embodiment of this disclosure, a UE receives a higher-layer signaling (radio resource control (RRC) or medium access control (MAC)). When the UE receives one or more UL grants that schedule PUSCH in one or more UL CCs in subframe n, the UE transmits A/N utilizing an A/N multiplexing scheme determined by an information element (IE) conveyed in the higher-layer signaling. On the other hand, when the UE receives no UL grants, the UE transmits A/N in PUCCH in the UL PCC.

In one example, an information element (IE), ANPiggybackConfiguration IE, is defined in the higher-layer. Depending on the signaled value of ANPiggybackConfiguration IE, the UE selects an A/N multiplexing scheme. In particular, when the UE receives one or more UL grants which schedule PUSCH in one or more UL CCs in subframe n, when ANPiggybackConfiguration=0, the UE transmits A/N using A/N transmission scheme 1 or 3 that transmits A/N in PUCCH in the UL PCC; and when ANPiggybackConfiguration=1, the UE transmits A/N using A/N transmission scheme 2 or 5 that piggybacks A/N in all the scheduled PUSCHs in subframe n.

In embodiments of this disclosure, a UE follows a rule to determine an A/N multiplexing method in a subframe. When a UE receives one or more UL grants that schedule PUSCH in one or more UL CCs in subframe n, the UE transmits A/N in subframe n utilizing a scheme selected according to the rule. On the other hand, when the UE receives no UL grants, the UE transmits A/N in the PUCCH in the UL PCC.

In one example rule (denoted as AN Tx Scheme Selection Rule 1), the UE selects an A/N transmission scheme depending on whether the UE receives at least one UL grant that requests a CQI report (e.g., the UL grant has a CQI request IE=1). In particular, when the UE receives at least one UL grant that requests a CQI report, the UE piggybacks A/N on all the PUSCHs carrying CQI; and when the UE does not receive any UL grant that requests a CQI report, the UE transmits A/N in the PUCCH in the UL PCC.

In this case, the eNodeB can find A/N in either the PUCCH in PCC or the PUSCH carrying CQI.

In another example rule (denoted as AN Tx Scheme Selection Rule 2), the UE selects an A/N transmission scheme depending on whether the UE receives an UL grant scheduling the PUSCH in the UL PCC. In one example (denoted as AN Tx Scheme Selection Rule 2-1) of AN Tx Scheme Selection Rule 2, when the UE receives an UL grant scheduling the PUSCH in the UL PCC, the UE piggybacks A/N on the PUSCH scheduled in the UL PCC; and when the UE does not receive an UL grant scheduling PUSCH in the UL PCC, the UE transmits A/N in the PUCCH in the UL PCC.

In this case, the eNodeB can find A/N in either the PUCCH in the PCC or the PUSCH transmitted in the UL PCC.

In another example rule (denoted by AN Tx Scheme Selection Rule 2-2) of AN Tx Scheme Selection Rule 2, when the UE receives an UL grant scheduling the PUSCH in the UL PCC, the UE transmits A/N in the PUCCH in the UL PCC; and when the UE does not receive an UL grant scheduling the PUSCH in the UL PCC, the UE piggybacks A/N on all the PUSCHs scheduled subframe n.

In this case, the eNodeB can find A/N in either the PUCCH in the PCC or in the scheduled PUSCHs.

In an embodiment of this disclosure, a UE follows a rule to determine an A/N multiplexing method in a subframe, where the rule is based at least partly on a higher-layer signaling (RRC or MAC). When a UE receives one or more UL grants that schedule the PUSCH in one or more UL CCs in subframe n, the UE transmits A/N in subframe n utilizing a scheme selected according to the rule. On the other hand, when the UE receives no UL grants, the UE transmits A/N in the PUCCH in the UL PCC.

In one example rule (denoted as AN Tx Scheme Selection Rule 3), the UE selects an A/N transmission scheme depending on whether the UE receives an UL grant scheduling the PUSCH in the UL PCC, and on a RRC signaling conveying an IE, such as ANPiggybackConfiguration IE. In particular, when the UE receives one or more UL grants that schedule the PUSCH in one or more UL CC in subframe n, when the UE receives an UL grant scheduling the PUSCH in the UL PCC and ANPiggybackConfiguration=1, the UE piggybacks A/N on the PUSCH scheduled in the UL PCC;

when the UE receives an UL grant scheduling the PUSCH in the UL PCC and ANPiggybackConfiguration=0, the UE transmits A/N in the PUCCH in the UL PCC;

when the UE does not receive an UL grant scheduling the PUSCH in the UL PCC and ANPiggybackConfiguration=1, the UE piggybacks A/N on all the PUSCHs scheduled subframe n; and when the UE does not receive an UL grant scheduling the PUSCH in the UL PCC and ANPiggybackConfiguration=0, the UE transmits A/N in the PUCCH in the UL PCC.

In Rel-8 LTE system, CQI/PMI/RI is piggybacked on the PUSCH in two cases. In one case (denoted as case 1), a UE receives an UL grant that requests CQI reporting (or with CQI request=1) in subframe n-4, and transmits CQI/PMI/RI in the scheduled PUSCH in subframe n. In the other case (denoted by case 2), a UE receives an UL grant that does not request CQI reporting (or with CQI request=0) in subframe n-k while the UE is scheduled to transmit a periodic CQI/PMI/RI report in subframe n by an RRC signaling, then the UE piggybacks CQI/PMI/RI on the scheduled PUSCH in subframe n.

In case 1, a UE receives an UL grant that requests CQI reporting in carrier aggregated systems. In carrier aggregated systems, a number of UL grants scheduling UL transmissions in a subframe can be multiple. Two sub-cases of case 1 are as follows: (1) case 1-1: a UE receives a single UL grant that requests CQI reporting, and (2) case 1-2: a UE receives more than one UL grant that requests CQI reporting.

In one embodiment, a UE receives at least one UL grant scheduling the PUSCH in an UL CC that requests CQI reporting on DL CC(s) in subframe n-k (where k=4 in FDD system), where each UL grant with requesting CQI reporting requests a CQI report on a number of DL CCs. In one example, an UL grant that requests CQI reporting is transmitted in DL CC i and requests a CQI report on DL CC i. In another example, an UL grant that requests CQI reporting is transmitted in DL CC i and requests a CQI report on all the activated DL CCs for the UE. In another example, an UL grant that requests CQI reporting is transmitted in DL CC i and requests a CQI report on all the configured DL CCs for the UE.

In one method of multiplexing CQI/PMI/RI transmissions and UL data transmissions in subframe n (denoted as method 1), after the UE receives the at least one UL grant in subframe n-k, the UE transmits a CQI report in subframe n in each of the PUSCHs scheduled by each of the at least one UL grant, while the UE transmits only UL data in the PUSCHs scheduled by the other UL grants, if any, that do not request CQI reporting. When an UL grant scheduling the PUSCH in an UL CC requests a CQI reporting on a number of DL CCs and schedules a number of pairs of UL PRBs larger than a threshold, e.g., 4 for a UE, the UE piggybacks CQI/PMI/RI on the number of DL CCs on the PUSCH in the UL CC according to methods proposed in U.S. Provisional Patent No. 61/206,455 and U.S. patent application Ser. No. 12/641,951. Otherwise, the UE transmits only CQI/PMI/RI in the PUSCH without UL data, similarly as done in Rel-8 LTE.

In one method of multiplexing CQI/PMI/RI transmissions and UL data transmissions in subframe n (denoted as method 1-1), a UE is configured to receive/transmit up to 3 DL-UL pairs of aggregated CCs, CC1, CC2 and CC3, and receives an UL grant with CQI request=1 in CC1 only. In particular embodiments, both CQI/PMI and RI are piggybacked on the PUSCH transmitted in CC1, i.e., the CC carrying the PUSCH with a CQI report. However, in other embodiments, only CQI/PMI or only RI is piggybacked on the PUSCH transmitted in the CC carrying the PUSCH with a CQI report.

In another embodiment of method 1-1, a UE is configured to receive/transmit up to 3 DL-UL pairs of aggregated CCs, CC1, CC2 and CC3, and receives two UL grants with CQI request=1 in CC1 and CC2 only. In particular embodiments, both CQI/PMI and RI are piggybacked on the PUSCH transmitted in each of CC1 and CC2, i.e., the CCs carrying PUSCH with a CQI report. However, in other embodiments, only CQI/PMI or only RI is piggybacked on the PUSCH transmitted in the CCs carrying the PUSCH with a CQI report.

In another method of multiplexing CQI/PMI/RI transmissions and UL data transmissions in subframe n (denoted as method 1-2), after the UE receives the at least one UL grant in subframe n-k, the UE transmits a CQI report in subframe n in each of the PUSCHs scheduled by all the UL grants scheduling the PUSCH in subframe n for the UE. When only one CQI report is requested, the information bits for the one CQI report are independently encoded, and the coded bits are separately mapped in all the UL CCs. When more than one CQI report is requested, the information bits for all the CQI reports are concatenated into one set of information bits. The one set of information bits are independently encoded, and the coded bits are separately mapped in all the UL CCs.

In another embodiment of method 1-2, a UE is configured to receive/transmit up to 3 DL-UL pairs of aggregated CCs, CC1, CC2 and CC3, and receives one UL grant with CQI request=1 in CC1 only. In particular embodiments, both CQI/PMI and RI are piggybacked on the PUSCH transmitted in each of CC1, CC2 and CC3, i.e., the CCs carrying PUSCH. However, in other embodiments, only CQI/PMI or only RI is piggybacked on the PUSCH transmitted in the CCs carrying the PUSCH.

In an embodiment of this disclosure, a UE is scheduled to transmit a periodic report CQI/PMI/RI in subframe n, which has been configured by a RRC signaling. In addition, the UE is scheduled to transmit PUSCHs in at least one UL CCs in the same subframe n.

In one method of multiplexing CQI/PMI/RI transmissions and UL data transmissions in subframe n (denoted as method 2-1), the UE piggybacks CQI/PMI/RI in one of the at least one UL CCs in which the UE is scheduled to transmit the PUSCH in subframe n, according to a CC selection rule. Some examples of the CC selection rule are:

(CC selection rule 1-1) an UL CC scheduled PUSCH with a highest MCS among the UL CCs scheduled PUSCH in subframe n is selected;

(CC selection rule 1-2) an UL CC scheduled PUSCH with a lowest CC-ID among the UL CCs scheduled PUSCH in subframe n is selected; and (CC selection rule 1-3) an UL CC scheduled PUSCH with a lowest carrier frequency among the UL CCs scheduled PUSCH in subframe n is selected.

In an embodiment of method 2-1, a UE is configured to receive/transmit up to 3 DL-UL pairs of aggregated CCs, CC1, CC2 and CC3, and receives three UL grants in CC1, CC2 and CC3. In particular embodiments, both CQI/PMI and RI are piggybacked on the PUSCH transmitted in CC1, which is the selected CC carrying CQI/PMI/RI piggybacked on the PUSCH according to a rule. However, in other embodiments, only CQI/PMI or only RI is piggybacked on the PUSCH transmitted in the selected CC.

In another method of multiplexing CQI/PMI/RI transmissions and UL data transmissions in subframe n (denoted as method 2-2), the UE chooses a transmission scheme of CQI/PMI/RI in subframe n by a rule, which depends on a whether the UE receives an UL grant scheduling PUSCH in the UL PCC or not. One example rule is if the UE receives an UL grant scheduling the PUSCH in the UL PCC in subframe n, the UE piggybacks CQI/PMI/RI in the PUSCH in the UL PCC. Otherwise, the UE transmits CQI/PMI/RI in the PUCCH in the PCC.

In this example rule, CQI/PMI/RI is never transmitted in the secondary component carriers (SCCs).

In an embodiment of method 2-2, a UE is configured to receive/transmit up to 2 DL-UL pairs of aggregated CCs, CC1 and CC2. When an UL grant is received scheduling the PUSCH in the UL PCC, CQI/PMI/RI is piggybacked. Otherwise, CQI/PMI/RI is transmitted in the PUCCH in the PCC. In particular embodiments, both CQI/PMI and RI are piggybacked on the PUSCH in CC1, or transmitted in the PUCCH in CC1. However, in other embodiments, only CQI/PMI or only RI is piggybacked on the PUSCH in CC1, or transmitted in the PUCCH in CC1. Furthermore, in particular embodiments, it is assumed that A/N is transmitted as in the same way as CQI/PMI/RI is transmitted, i.e., if there is an UL grant scheduling the PUSCH in the UL PCC, A/N is piggybacked in the PUSCH transmitted in the UL PCC. Otherwise, A/N is transmitted in the PUCCH in the UL PCC. However, one of ordinary skill in the art would recognize that other A/N multiplexing schemes can also be used for A/N multiplexing.

When one or two A/N bits and CQI/PMI/RI are multiplexed in the PUCCH in the UL PCC, PUCCH format 2b is used for the multiplexing of A/N and CQI/PMI/RI according to Rel-8 LTE method. On the other hand, when a number of A/N bits to be transmitted is three or four, again PUCCH format 2b structure is used for multiplexing CQI/PMI/RI and A/N, having five SC-FDM symbols for CQI/PMI/RI and two SC-FDM symbols for A/N in each slot of a subframe. However, each slot carries one QPSK symbol conveying two A/N bits (denoted by PUCCH format 2c): two A/N bits are QPSK-modulated, and the QPSK symbol is multiplied to the DM RS sequence transmitted in the second DM RS SC-FDM symbol in the first slot of subframe n. The other two A/N bits are QPSK-modulated, and the QPSK symbol is multiplied to the DM RS sequence transmitted in the second DM RS SC-FDM symbol in the second slot of subframe n.

In another method of multiplexing CQI/PMI/RI transmissions and UL data transmissions in subframe n (denoted as method 2-3), the UE piggybacks CQI/PMI/RI in all of the at least one UL CCs in which the UE is scheduled to transmit the PUSCH in subframe n.

In an embodiment of method 2-3, a UE is configured to receive/transmit up to 3 DL-UL pairs of aggregated CCs, CC1, CC2 and CC3, and receives three UL grants in CC1, CC2 and CC3. In particular embodiments, both CQI/PMI and RI are piggybacked on the PUSCHs transmitted in CC1, CC2 and CC3, which are all the CCs carrying the PUSCH with piggybacking CQI/PMI/RI. However, in other embodiments, only CQI/PMI or only RI is piggybacked on the PUSCH transmitted in each of these CCs.

In embodiments of this disclosure, a UE selects a PUSCH carrying data with the highest spectral efficiency among PUSCHs scheduled in a subframe, and piggybacks UCI (CQI/PMI/RI/HARQ-ACK) only in the selected PUSCH. In particular embodiments, to determine the PUSCH with the highest spectral efficiency, the UE first reads UL grants scheduling PUSCHs in the subframe, and determines the transmission ranks, modulation formats and TB sizes of the scheduled PUSCHs. The transmission rank refers to a number of streams (or DMRS antenna ports, or layers) to be transmitted in a subframe by a UE. The UE then determines the PUSCH with the highest spectral efficiency based at least partly upon a rule.

In one example rule, the UE selects a PUSCH with the highest rank, among all the scheduled PUSCHs in the subframe.

When there are multiple PUSCHs with the same highest rank, a tie-breaking rule is used. Some example tie-breaking rules are:
- the UE selects a PUSCH carried in a CC with the smallest CC ID, among all the PUSCHs with the highest rank;
- the UE selects a PUSCH carried in a CC with the smallest carrier frequency, among all the PUSCHs with the highest rank;
- the UE selects a PUSCH carried in a PCC if PCC has an UL grant in the subframe;
- the UE selects a PUSCH carrying the largest number of information bits per physical resource block (PRB), among all the PUSCHs with the highest rank. In a particular embodiment, the number of information bits per PRB carried in a PUSCH is a sum of at most two TB sizes corresponding to at most two TBs, divided by the number of physical resource blocks (PRBs). In other words, the number of information bits per PRB carried in PUSCH i is calculated as shown in Equation 9 below:

$$(\text{\# of info bits per } PRB)i = ((TB\_\text{Size1})i + (TB\_\text{Size2})i)/(\text{\# of } PRBs)i; \text{ and} \quad [\text{Eqn. 9}]$$

- the UE selects a PUSCH carrying a CW with the largest number of information bits per PRB, among all the PUSCHs with the highest rank. In a particular embodiment, the number of information bits in a CW per PRB carried in a PUSCH is a TB size corresponding to a CW, divided by the number of PRBs. In other words, the number of information bits in CW q per PRB carried in PUSCH i is calculated as shown in Equation 10 below:

$$(\text{\# of info bits per } PRB)qi = (TB\_\text{Size})qi/(\text{\# of } PRBs)qi. \quad [\text{Eqn. 10}]$$

In another example rule, the UE selects a PUSCH carrying the largest number of information bits per PRB, among all the scheduled PUSCHs in the subframe. In a particular embodiment, the number of information bits per PRB carried in a PUSCH is a sum of two TB sizes corresponding to two TBs, divided by the number of PRBs. In other words, the number of information bits per PRB carried in PUSCH i is calculated as shown in Equation 11 below:

$$(\text{\# of info bits per } PRB)i = ((TB\_\text{Size1})i + (TB\_\text{Size2})i)/(\text{\# of } PRBs)i. \quad [\text{Eqn. 11}]$$

In another example rule, the UE selects a CW (or a TB) with the highest initial MCS and a PUSCH carrying the CW, among all the CWs (or TBs) to be transmitted in the subframe.

When a PUSCH is selected for UCI multiplexing, CQI/PMI and HARQ-ACK/RI are multiplexed with the UL-SCH in the PUSCH, according to a method.

In one example method, CQI/PMI is carried in a CW in the PUSCH with a higher initial-transmission MCS, and HARQ-ACK/RI is carried in all the CWs in the PUSCH.

In another example method, CQI/PMI is carried in a fixed CW (e.g., a first CW, or CW 0) in the PUSCH, and HARQ-ACK/RI is carried in all the CWs in the PUSCH.

In one example rule, the UE selects a PUSCH with the highest rank, among all the scheduled PUSCHs in the subframe. This can be described by Equation 12 below, where k* is the index of the PUSCH to carry UCI:

$$k^* = \arg\max r(k), \quad [\text{Eqn. 12}]$$

where r(k) is a transmission rank (or a number of transmission layers) of the PUSCH k.

Other examples of tie-breaking rules are:

the UE selects a PUSCH carrying the largest number of information bits per resource element (RE) in all the transmission layers, among all the scheduled PUSCHs in the subframe. In a particular embodiment, the number of information bits per RE in all the transmission layers carried in a PUSCH is a sum of two TB sizes corresponding to two TBs, divided by the total number of REs in each transmission layer. In other words, the number of information bits per RE in all the transmission layers carried in PUSCH k is calculated as shown in Equation 13 below:

$$(\# \text{ of info bits per } RE \text{ in all transmission layers})_k = \frac{\sum_{r=0}^{C_1-1} K_{r,1}(k) + \sum_{r=0}^{C_2-1} K_{r,2}(k)}{M_{sc}^{PUSCH-initial}(k) \cdot N_{symb}^{PUSCH-initial}(k)},$$ [Eqn. 13]

where the number of PUSCH subcarriers $M_{sc}^{PUSCH-initial}(k)$, the number of codeblocks in TB1 and TB2 $C_1(k)$ and $C_2(k)$, and the number of information bits in the r-th codeblock in TB1 and TB2, $K_{r,1}(k)$ and $K_{r,2}(k)$ are obtained from the initial PDCCH for the same transport block; and the UE selects a PUSCH carrying a CW with the largest number of information bits per RE in all the transmission layers corresponding to the CW, among all the PUSCHs with the highest rank. In a particular embodiment, the number of information bits in a CW per RE in all the transmission layers corresponding to the CW is a TB size corresponding to the CW, divided by the total number of REs in each transmission layer. In other words, the number of information bits in CW q per RE carried in PUSCH k is calculated as shown in Equation 14 below:

$$(\# \text{ of info bits per } RE \text{ in all transmission layers in CW } q)_k = \frac{\sum_{r=0}^{C_q-1} K_{r,q}(k)}{M_{sc}^{PUSCH-initial}(k) \cdot N_{symb}^{PUSCH-initial}(k)},$$ [Eqn. 14]

In another example rule, the UE selects a PUSCH carrying the largest number of information bits per RE in all the transmission layers, among all the scheduled PUSCHs in the subframe. This can be described by Equation 15 below, where k* is the index of the PUSCH to carry UCI:

$$k^* = \text{argmax} SE(k),$$ [Eqn. 15]

where SE(k) is a number of information bits per RE in all the transmission layers of PUSCH k.

In a particular embodiment, the number of information bits per RE in all the transmission layers carried in a PUSCH is a sum of up to two TB sizes corresponding to two TBs, divided by the number of REs in each transmission layer. In other words, the number of information bits per RE in all the transmission layers carried in PUSCH k is calculated as shown in Equation 16 below:

$$SE(k) = \frac{\sum_{q=1}^{Ncw(k)} \sum_{r=0}^{C_q-1} K_{r,q}(k)}{M_{sc}^{PUSCH-initial}(k) \cdot N_{symb}^{PUSCH-initial}(k)},$$ [Eqn. 16]

where the number of PUSCH subcarriers $M_{sc}^{PUSCH-initial}(k)$, the number of codeblocks in TB1 and TB2 $C_1(k)$ and $C_2(k)$, and the number of information bits in the r-th codeblock in TB1 and TB2, and $K_{r,1}(k)$ and $K_{r,2}(k)$ are obtained from the initial PDCCH for the same transport block. Ncw(k) is the number of TBs (or CWs) in PUSCH k.

In another example rule, the UE selects a PUSCH carrying the largest average number of information bits per RE, averaged over all the transmission layers, among all the scheduled PUSCHs in the subframe. In a particular embodiment, this can be described by Equation 17 below, where k* is the index of the PUSCH to carry UCI:

$$k^* = \text{argmax} SE'(k)$$ [Eqn. 17]

where SE'(k) is an average number of information bits per RE of PUSCH k.

In a particular embodiment, the average number of information bits per RE carried in a PUSCH is a sum of up to two TB sizes corresponding to two TBs, divided by the total number of REs in all the transmission layers. In other words, the average number of information bits per RE carried in PUSCH k is calculated as shown in Equation 18 below:

$$SE'(k) = \frac{\sum_{q=1}^{Ncw(k)} \sum_{r=0}^{C_q-1} K_{r,q}(k)}{N_L(k) M_{sc}^{PUSCH-initial}(k) \cdot N_{symb}^{PUSCH-initial}(k)},$$ [Eqn. 18]

where the number of PUSCH subcarriers $M_{sc}^{PUSCH-initial}(k)$, the number of codeblocks in TB1 and TB2 $C_1(k)$ and $C_2(k)$, and the number of information bits in the r-th codeblock in TB1 and TB2, $K_{r,1}(k)$ and $K_{r,2}(k)$ are obtained from the initial PDCCH for the same transport block. Ncw(k) is the number of TBs (or CWs), and $N_L(k)$ is the number of transmission layers (or transmission rank) in PUSCH k.

In another example rule, the UE selects a PUSCH whose average MCS is the largest. In a particular embodiment, this can be described by Equation 19 below, where k* is the index of the PUSCH to carry UCI:

$$k^* = \text{argmax} MCS_{avg}(k),$$ [Eqn. 19]

where $MCS_{avg}(k)$ is obtained by taking the average of up to two initial MCS's corresponding to up to two TBs carried in PUSCH k.

In another example rule, the UE selects a PUSCH whose sum MCS is the largest. In a particular embodiment, this can be described by Equation 20 below, where k* is the index of the PUSCH to carry UCI:

$$k^* = \text{argmax} MCS_{sum}(k),$$ [Eqn. 20]

where $MCS_{sum}(k)$ is obtained by taking the sum of up to two initial MCS's corresponding to up to two TBs carried in PUSCH k.

In another example rule, the UE selects a PUSCH carrying a CW with the largest number of information bits per RE in all the transmission layers corresponding to the CW, among all the PUSCHs with the highest rank. In a particular embodiment, this can be described by Equation 21 below, where k* is the index of the PUSCH to carry UCI:

$$k^* = \underset{k}{\operatorname{argmax}} SE(k, q), \qquad [\text{Eqn. 21}]$$

where SE(k,q) is a number of information bits per RE in all the transmission layers corresponding to a CW of PUSCH k.

In a particular embodiment, the number of information bits in a CW per RE in all the transmission layers corresponding to the CW is a TB size corresponding to the CW, divided by the total number of REs in each transmission layer. In other words, the number of information bits in CW q per PRB carried in PUSCH k is calculated as shown in Equation 22 below:

$$SE(k, q) = \frac{\sum_{r=0}^{C_q-1} K_{r,q}(k)}{M_{sc}^{PUSCH-initial}(k) \cdot N_{symb}^{PUSCH-initial}(k)}, \qquad [\text{Eqn. 22}]$$

In another example rule, the UE selects a PUSCH carrying the largest number of information bits per RE summed over all the transmission layers. In particular embodiments, the number of bits per RE summed over all the transmission layers are calculated as follows:

(# of information bits per RE summed over all the layers)$i=(N_{L1}SE_1+N_{L2}SE_2)_i$,     Option 1 where $N_{L1}$ and $N_{L2}$ are numbers of layers corresponding to CW0 (or TB1) and CW1 (TB2), respectively, and $SE_1$ and $SE_2$ are the spectral efficiency per layer calculated through the initial MCS's for TB1 and TB2. For example, $SE_1$ is calculated as shown in Equation 23 below:

$$SE_1 = \frac{M_{sc}^{PUSCH-initial} \cdot N_{symb}^{PUSCH-initial}}{\sum_{r=0}^{C_1-1} K_{r,1}}, \qquad [\text{Eqn. 23}]$$

where the number of PUSCH subcarriers $M_{sc}^{PUSCH-initial}$, the number of codeblocks in TB1 $C_1$, and the number of information bits in the r-th codeblock in TB1 $K_{r,1}$ are obtained from the initial PDCCH for the same transport block.

(# of information bits per RE summed over all the CWs)$i=(SE_1+SE_2)_i$,     Option 2 where $SE_1$ and $SE_2$ are the spectral efficiency per layer calculated through the initial MCS's for TB1 and TB2. For example, $SE_1$ is calculated as shown in Equation 24 below:

$$SE_1 = \frac{M_{sc}^{PUSCH-initial} \cdot N_{symb}^{PUSCH-initial}}{\sum_{r=0}^{C_1-1} K_{r,1}}, \qquad [\text{Eqn. 24}]$$

where the number of PUSCH subcarriers $M_{sc}^{PUSCH-initial}$, the number of codeblocks in TB1 $C_1$, and the number of information bits in the r-th codeblock in TB1 $K_{r,1}$ are obtained from the initial PDCCH for the same transport block.

Option 2 is motivated from the observation that CW1 and CW2 would always use the same transmission power under the agreed LTE-A UL MIMO codebook.

In another example rule, the UE selects a CW (or a TB) with the highest initial MCS and a PUSCH carrying the CW, among all the CWs (or TBs) to be transmitted in the subframe.

When a PUSCH is selected for UCI multiplexing, CQI/PMI and HARQ-ACK/RI are multiplexed with the UL-SCH in the PUSCH, according to a method.

In one example method, CQI/PMI is carried in a CW in the PUSCH with a higher initial-transmission MCS. HARQ-ACK/RI is carried in all the CWs in the PUSCH.

In another example method, CQI/PMI is carried in a fixed CW (e.g., a first CW, or CW 0) in the PUSCH. HARQ-ACK/RI is carried in all the CWs in the PUSCH.

In an embodiment of this disclosure, a UE selects a PUSCH that would use the least number of REs for HARQ-ACK (or alternatively, RI), and piggybacks UCI (CQI/PMI/RI/HARQ-ACK) only in the selected PUSCH. Particular embodiments can be described by Equation 25 below, where k* is the index of PUSCH to carry UCI:

$$k^* = \operatorname{argmin} Q'(k), \qquad [\text{Eqn. 25}]$$

where Q'(k) is the number of REs that would be used for HARQ-ACK (or alternatively RI), in case PUSCH k is selected for UCI transmission. In calculating Q'(k) for each scheduled PUSCH, the UE assumes a common UCI payload and a common UCI type. In one example, the UE assumes 1-bit HARQ-ACK for the calculation. In another example, the UE assumes O-bit HARQ-ACK, where O is the number of HARQ-ACK bits to be transported in the subframe.

In a particular embodiment, when PUSCH k is commanded to do SIMO transmission by a corresponding UL grant, the number of REs carrying O-bit HARQ-ACK is calculated as shown in Equation 26 below:

$$Q'(k) = \min\left(\left\lceil \frac{O \cdot M_{sc}^{PUSCH-initial}(k) \cdot N_{symb}^{PUSCH-initial}(k) \cdot \beta_{offset}^{PUSCH}(k)}{\sum_{r=0}^{C(k)-1} K_r(k)} \right\rceil, 4 \cdot M_{sc}^{PUSCH}(k)\right), \qquad [\text{Eqn. 26}]$$

In particular embodiments, $\beta_{offset}^{PUSCH}(k) = \beta_{offset}^{HARQ-ACK}(k)$, which is determined according to 3GPP Technical Specification No. 36.213, version 8.5.0, "E-UTRA, Physical Layer Procedures", December 2008, which is hereby incorporated by reference into the present application as if fully set forth herein.

The number of PUSCH subcarriers $M_{sc}^{PUSCH-initial}(k)$, the number of codeblocks in the transmitted TB C(k), and the number of information bits in the r-th codeblock $K_r(k)$ are obtained from the initial PDCCH for the same transport block.

When PUSCH k is commanded to do MIMO transmission (or 2-TB or 2-CW transmission) by a corresponding UL grant, the number of REs to carry O-bit HARQ-ACK or RI is calculated according to a method. Some example methods are listed below.

Method 1: The number of REs Q'(k) is the total number of REs to be used for O-bit HARQ-ACK or RI, calculated by summing up all the HARQ-ACK or RI REs across all the transmission layers. Assuming that $Q'_{layer}(k)$ is the number of REs to be used for HARQ-ACK in one layer, the total number of REs Q'(k) is $Q'(k)=N_L(k)Q'_{layer}(k)$. Some example options are listed below.

Option 1-1 as shown in Equation 27 below:

$$Q'(k) = N_L(k) \min\left(\left\lceil \frac{O \cdot M_{sc}^{PUSCH-initial}(k) \cdot N_{symb}^{PUSCH-initial}(k) \cdot \beta_{offset}^{PUSCH}(k)}{\sum_{r=0}^{C_1(k)-1} K_{r,1}(k) + \sum_{r=0}^{C_2(k)-1} K_{r,2}(k)} \right\rceil, 4 \cdot M_{sc}^{PUSCH}(k)\right),$$ [Eqn. 27]

where $\beta_{offset}^{PUSCH}(k) = \beta_{offset}^{HARQ-ACK}(k)$, which is determined according to 3GPP Technical Specification No. 36.213, version 8.5.0, "E-UTRA, Physical Layer Procedures", December 2008, which is hereby incorporated by reference into the present application as if fully set forth herein.

The number of PUSCH subcarriers $M_{sc}^{PUSCH-initial}(k)$, the number of codeblocks in TB1 and TB2 $C_1(k)$ and $C_2(k)$, and the number of information bits in the r-th codeblock in TB1 and TB2, $K_{r,1}(k)$ and $K_{r,2}(k)$ are obtained from the initial PDCCH for the same transport block. $N_L(k)$ is the total number of transmission layers (or transmission rank) in the PUSCH k.

Option 1-2 as shown in Equation 28 below:

$$Q'(k) = N_L(k)\min\left(\left\lceil \frac{O \cdot M_{sc}^{PUSCH-initial}(k) \cdot N_{symb}^{PUSCH-initial}(k) \cdot \beta_{offset}^{PUSCH}(k)}{\frac{\sum_{r=0}^{C_1(k)-1} K_{r,1}(k)}{\beta_{offset,TB1}^{PUSCH}(k)} + \frac{\sum_{r=0}^{C_2(k)-1} K_{r,2}(k)}{\beta_{offset,TB2}^{PUSCH}(k)}} \right\rceil, 4 \cdot M_{sc}^{PUSCH}(k)\right),$$ [Eqn. 28]

where $\beta_{offset,TB1}^{PUSCH}(k) = \beta_{offset,TB1}^{HARQ-ACK}(k)$, and $\beta_{offset,TB2}^{PUSCH}(k) = \beta_{offset,TB2}^{HARQ-ACK}(k)$, each of which is determined according to 3GPP Technical Specification No. 36.213, version 8.5.0, "E-UTRA, Physical Layer Procedures", December 2008, which is hereby incorporated by reference into the present application as if fully set forth herein.

Option 1-3 as shown in Equation 29 below:

$$Q'(k) = N_L(k)\min\left(\left\lceil \frac{M_{sc}^{PUSCH-initial}(k) \cdot N_{symb}^{PUSCH-initial}(k)}{\sum_{n=1}^{Ncw} + \sum_{r=0}^{C_n-1} K_r + O \cdot \beta_{offset}} O \cdot \beta_{offset} \right\rceil, 4 \cdot M_{sc}^{PUSCH}(k)\right),$$ [Eqn. 29]

where $\beta_{offset}$ can be dependent on rank.

Method 2: The number of REs Q'(k) is the number of REs to be used for O-bit HARQ-ACK or RI in each transmission layer. This method is motivated because the total number of HARQ-ACK REs transmitted with full power equals the number in each layer. Assuming that $Q'_{layer}(k)$ is the number of REs to be used for HARQ-ACK in one layer, the total number of REs Q'(k) is $Q'(k) = Q'_{layer}(k)$.

Option 2-1 as shown in Equation 30 below:

$$Q'(k) = \min\left(\left\lceil \frac{O \cdot M_{sc}^{PUSCH-initial}(k) \cdot N_{symb}^{PUSCH-initial}(k) \cdot \beta_{offset}^{PUSCH}(k)}{\sum_{r=0}^{C_1(k)-1} K_{r,1}(k) + \sum_{r=0}^{C_2(k)-1} K_{r,2}(k)} \right\rceil, 4 \cdot M_{sc}^{PUSCH}(k)\right),$$ [Eqn. 30]

Option 2-2 as shown in Equation 31 below:

$$Q'(k) = \min\left(\left\lceil \frac{O \cdot M_{sc}^{PUSCH-initial}(k) \cdot N_{symb}^{PUSCH-initial}(k) \cdot \beta_{offset}^{PUSCH}(k)}{\sum_{r=0}^{C_1(k)-1} K_{r,1}(k)}{\beta_{offset,TB1}^{PUSCH}(k)} + \frac{\sum_{r=0}^{C_2(k)-1} K_{r,2}(k)}{\beta_{offset,TB2}^{PUSCH}(k)}} \right\rceil, 4 \cdot M_{sc}^{PUSCH}(k) \right).$$  [Eqn. 31]

Option 2-3 as shown in Equation 32 below:

$$Q'(k) = \min\left(\left\lceil \frac{M_{sc}^{PUSCH-initial}(k) \cdot N_{symb}^{PUSCH-initial}(k)}{\sum_{n=1}^{Ncw}\sum_{r=0}^{C_n-1} K_r + O \cdot \beta_{offset}} O \cdot \beta_{offset}\right\rceil, 4 \cdot M_{sc}^{PUSCH}(k)\right),$$  [Eqn. 32]

where $\beta_{offset}$ can be dependent on rank.

Note that the Q'(k) calculated according to Method 2 is $1/N_L(k)$ of the Q'(k) calculated according to Method 1.

When an aperiodic CQI report is requested for a subframe for a UE, the UE transmits CQI/PMI/RI in a PUSCH scheduled by an UL grant. When a periodic CQI reporting is scheduled in the same subframe, the periodic CQI report would have redundant information, and hence it is proposed that the UE drop the periodic CQI reporting and transmit aperiodic CQI reporting only. On the other hand, when A/N feedback is scheduled in the same subframe, it is not desired to drop A/N as A/N carries important information used for HARQ process. Two options of transmitting A/N can be considered: (option 1) A/N is piggybacked in a PUSCH, or (option 2) A/N is transmitted in the PUCCH in the UL PCC. When option 2 is used, some negative impacts can arise, such as peak-to-average power ratio (PAPR) may increase, and/or intermodulation distortion (IMD) may worsen. When option 1 is used, data throughput can be reduced as some of the data REs are overwritten with A/N modulation symbols. Considering the pros and cons of option 1 and option 2, a few methods are provided to instruct a UE to switch between these two options.

When no aperiodic CQI reports are requested for a subframe for a UE, the UE can have A/N and/or periodic CQI/PMI/RI to transmit in the subframe. When there is no PUSCH grants for the subframe, the UE sends A/N and/or periodic CQI/PMI/RI in PUCCH in the PCC. However, there is at least one PUSCH grant for the subframe. Two options of transmitting A/N and/or periodic CQI/PMI/RI can be considered: (option 1) A/N and/or periodic CQI/PMI/RI is piggybacked in a PUSCH, or (option 2) A/N and/or CQI/PMI/RI is transmitted in the PUCCH in the PCC. When option 2 is used, some negative impacts can arise, such as peak-to-average power ratio (PAPR) may increase, and/or intermodulation distortion (IMD) may worsen. When option 1 is used, data throughput can be reduced as some of the data REs are overwritten with A/N modulation symbols. Considering the pros and cons of option 1 and option 2, a few methods are provided to instruct a UE to switch between these two options.

In this disclosure, for UCI multiplexing in the PUSCH in carrier aggregations, the following three methods are considered.

In one method (denoted as method 1), PUSCH+PUCCH is not configured. In such an embodiment, UCI is piggybacked on only one PUSCH.

In another method (denoted as method 2), PUSCH+PUCCH is configured, and the PUSCH+PUCCH configuration is followed. In such an embodiment, UCI is separately transmitted in the PUCCH, and only UL-SCH data is transmitted in the PUSCH.

In another method (denoted by method 3), PUSCH+PUCCH is configured, and the PUSCH+PUCCH configuration is overridden. In such an embodiment, if an UL primary component carrier (UL PCC) has a PUSCH grant, UCI is separately transmitted in the PUCCH in the PCC, and only UL-SCH data is transmitted in the PUSCH in the PCC. If the UL PCC does not have a PUSCH grant and at least one UL SCC has a PUSCH grant, UCI is piggybacked on only one PUSCH scheduled in one of the at least one UL SCC.

In embodiments of this disclosure, a RRC signaling indicates one method out of at least two methods from the above three methods. In particular embodiments, a RRC IE used for this indication is denoted as UCIPiggybackConfiguration IE. UCIPiggybackConfiguration IE determines how a UE transmits UCI when UCI and data are simultaneously scheduled in the same subframe.

In one example, UCIPiggybackConfiguration IE indicates one method between two methods as shown in Table 1 below:

TABLE 1

| UCIPiggybackConfiguration IE | UCI multiplexing method |
|---|---|
| 0 | method 1 |
| 1 | method 2 |

In another example, UCIPiggybackConfiguration IE indicates one method between three methods as shown in Table 2 below:

TABLE 2

| UCIPiggybackConfiguration IE | UCI multiplexing method |
|---|---|
| 0 | method 1 |
| 1 | method 2 |
| 2 | method 3 |

In one example, UCIPiggybackConfiguration IE indicates one method between two methods as shown in Table 3 below:

TABLE 3

| UCIPiggybackConfiguration IE | UCI multiplexing method |
| --- | --- |
| 0 | method 1 |
| 1 | method 3 |

An embodiment is considered where method 1 is indicated by the RRC signaling, i.e., UCI piggyback on only one PUSCH, or where the RRC does not convey UCIPiggyback-Configuration IE to a UE. In such an embodiment, if the UE receives one UL grant with CQI request=1 scheduling a PUSCH and an aperiodic CQI report in an UL CC in a subframe, the UE would piggyback UCI on the PUSCH to carry an aperiodic CQI report in the UL CC in the subframe. If the UE does not receive any UL grants with CQI request=1 but the UE receives an UL grant scheduling a PUSCH in the UL PCC, the UE piggybacks UCI in the PUSCH in the UL PCC. If the UE receives neither any UL grants with CQI request=1 nor an UL grant scheduling a PUSCH in the UL PCC, the UE piggybacks UCI in the PUSCH in one of the UL SCCs to carry PUSCH in the subframe, according to a rule.

Figure 7:
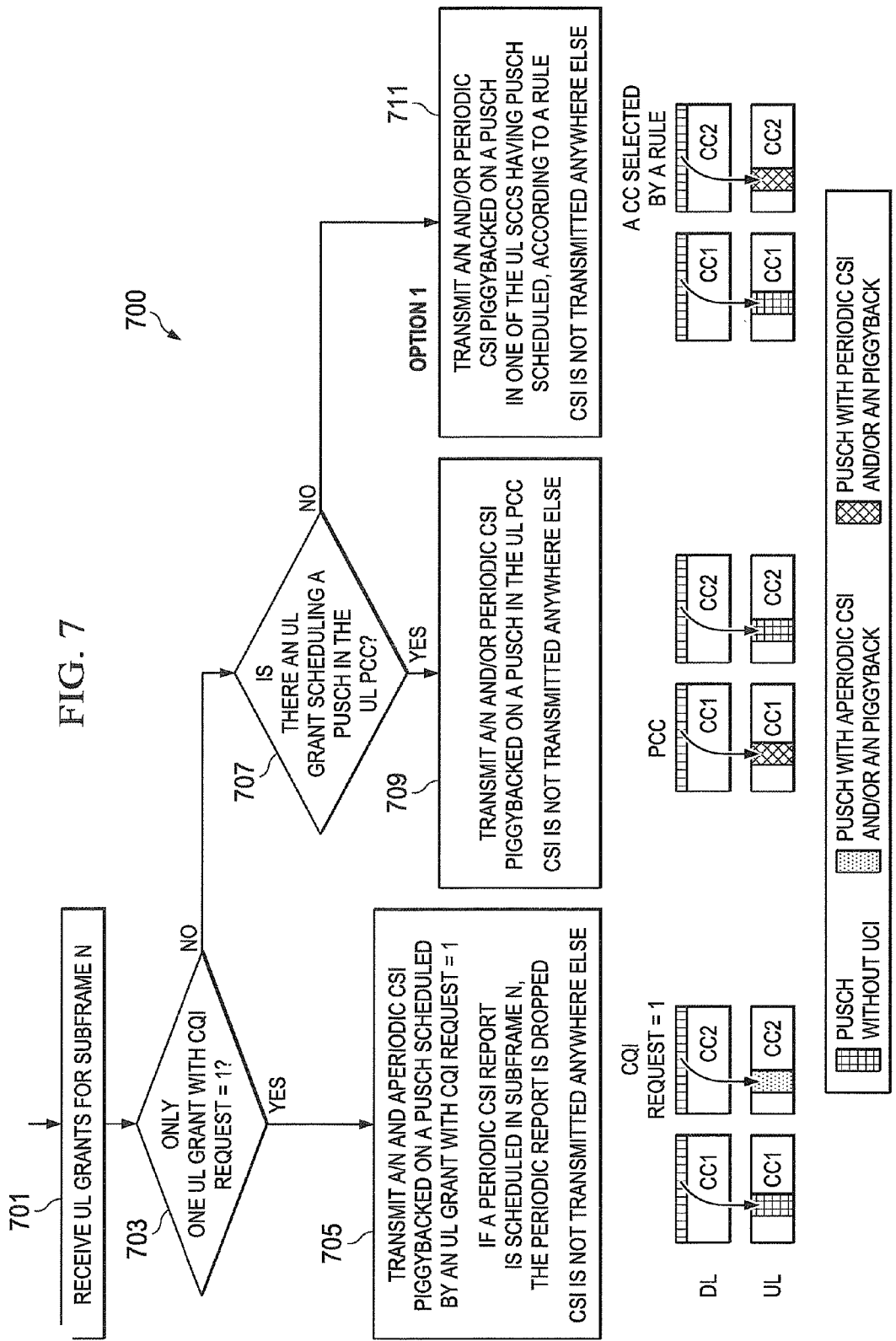
FIG. 7 illustrates a method of operating a user equipment or subscriber station according to an embodiment of this disclosure.

FIG. 7 illustrates a method 700 of operating a user equipment or subscriber station according to an embodiment of this disclosure.

As shown in FIG. 7, a UE receives one or more UL grants scheduling the PUSCH in the UL CC i for subframe n (block 701). The UE determines if only one of the UL grants for subframe n has a CQI-request with a particular value, such as 1, 01, 10, or 11 (block 703). If the UE determines that one or more of the UL grants have a CQI-request with the particular value, the UE piggybacks A/N with an aperiodic channel state information (CSI) report transmitted in the PUSCH in UL CC i (block 705). The CSI report contains, for example, CQI/PMI/RI information. Only UL CC i will be used for UCI transmission. If a periodic CSI report is scheduled in the same subframe as the aperiodic CSI report, the UE drops the periodic CSI report. CSI is not transmitted any where else.

If the UE determines that none of the UL grants have a CQI-request with the particular value, the UE determines if an UL grant scheduling a PUSCH in the UL PCC has been received (block 707). If an UL grant scheduling a PUSCH in the UL PCC has been received, the UE piggybacks A/N and/or periodic CSI on the PUSCH in the PCC (block 709). Only the UL PCC will be used for CSI transmission. CSI is not transmitted any where else.

If an UL grant scheduling a PUSCH in the UL PCC has not been received, the UE piggybacks A/N and/or periodic CSI on a PUSCH in one of the UL SCCs having PUSCH scheduled, where the SCC is selected according to a rule, e.g., highest MCS, smallest UL CC number, smallest carrier frequency UL CC, etc. (block 711). CSI is not transmitted any where else.

Figure 8:
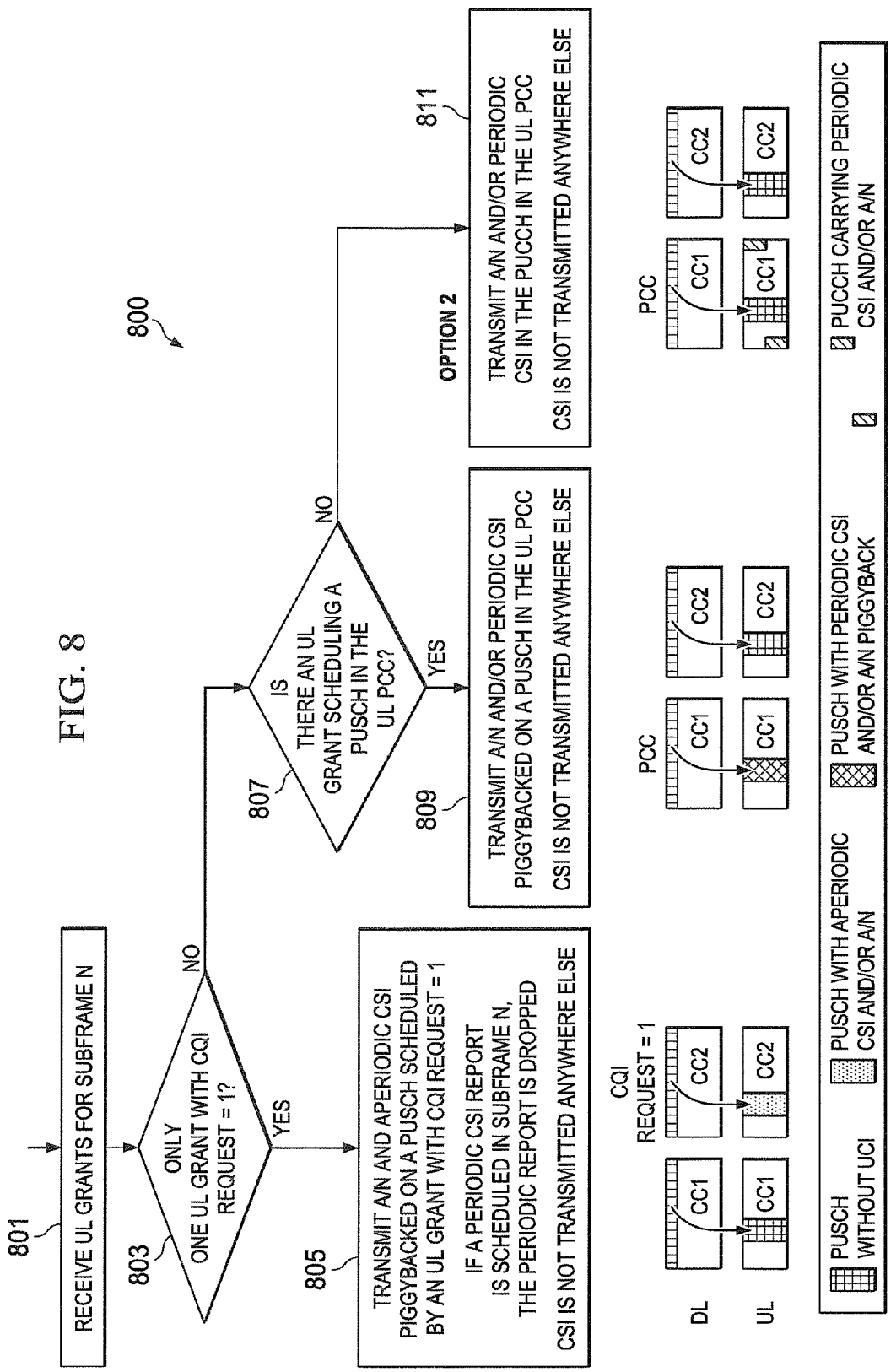
FIG. 8 illustrates a method of operating a user equipment or subscriber station according to another embodiment of this disclosure.

FIG. 8 illustrates a method 800 of operating a user equipment or subscriber station according to another embodiment of this disclosure.

As shown in FIG. 8, a UE receives one or more UL grants scheduling the PUSCH in the UL CC i for subframe n (block 801). The UE determines if only one of the UL grants for subframe n has a CQI-request with a particular value, such as 1, 01, 10, or 11 (block 803). If the UE determines that only one of the UL grants has a CQI-request with the particular value, the UE piggybacks A/N with an aperiodic CSI report transmitted in the PUSCH in UL CC i (block 805). Only UL CC i will be used for CSI transmission. If a periodic CSI report is scheduled in the same subframe as the aperiodic CSI report, the UE drops the periodic CSI report. CSI is not transmitted any where else.

If the UE determines that none of the UL grants have a CQI-request with the particular value, the UE determines if an UL grant scheduling a PUSCH in the UL PCC has been received (block 807). If an UL grant scheduling a PUSCH in the UL PCC has been received, the UE piggybacks A/N and/or a periodic CSI report on the PUSCH in the PCC (block 809). Only the UL PCC will be used for CSI transmission. CSI is not transmitted any where else.

If an UL grant scheduling a PUSCH in the UL PCC has not been received, the UE transmits A/N and/or a periodic CSI report in a PUCCH in the UL PCC (block 811). CSI is not transmitted any where else.

An embodiment is considered where method 2 is indicated by the RRC signaling, i.e., UCI or CSI is separately transmitted in the PUCCH and only the UL-SCH data is transmitted in PUSCHs. If the UE receives one UL grant with CQI request=1 scheduling a PUSCH and an aperiodic CSI report in an UL CC in a subframe, two UE behaviors can be considered. In one option, the UE transmits CSI in the PUCCH in the UL PCC. In another option, the UE piggybacks CSI on the PUSCH to carry an aperiodic CSI report in the UL CC in the subframe. If the UE does not receive any UL grants with CQI request=1 but receives an UL grant scheduling a PUSCH in the UL PCC, the UE transmits UCI or CSI in the PUCCH in the UL PCC. If the UE receives neither any UL grants with CQI request=1 nor an UL grant scheduling a PUSCH in the UL PCC, the UE piggybacks UCI or CSI in the PUSCH in one of the UL SCCs to carry the PUSCH in the subframe according to a rule.

Figure 9:
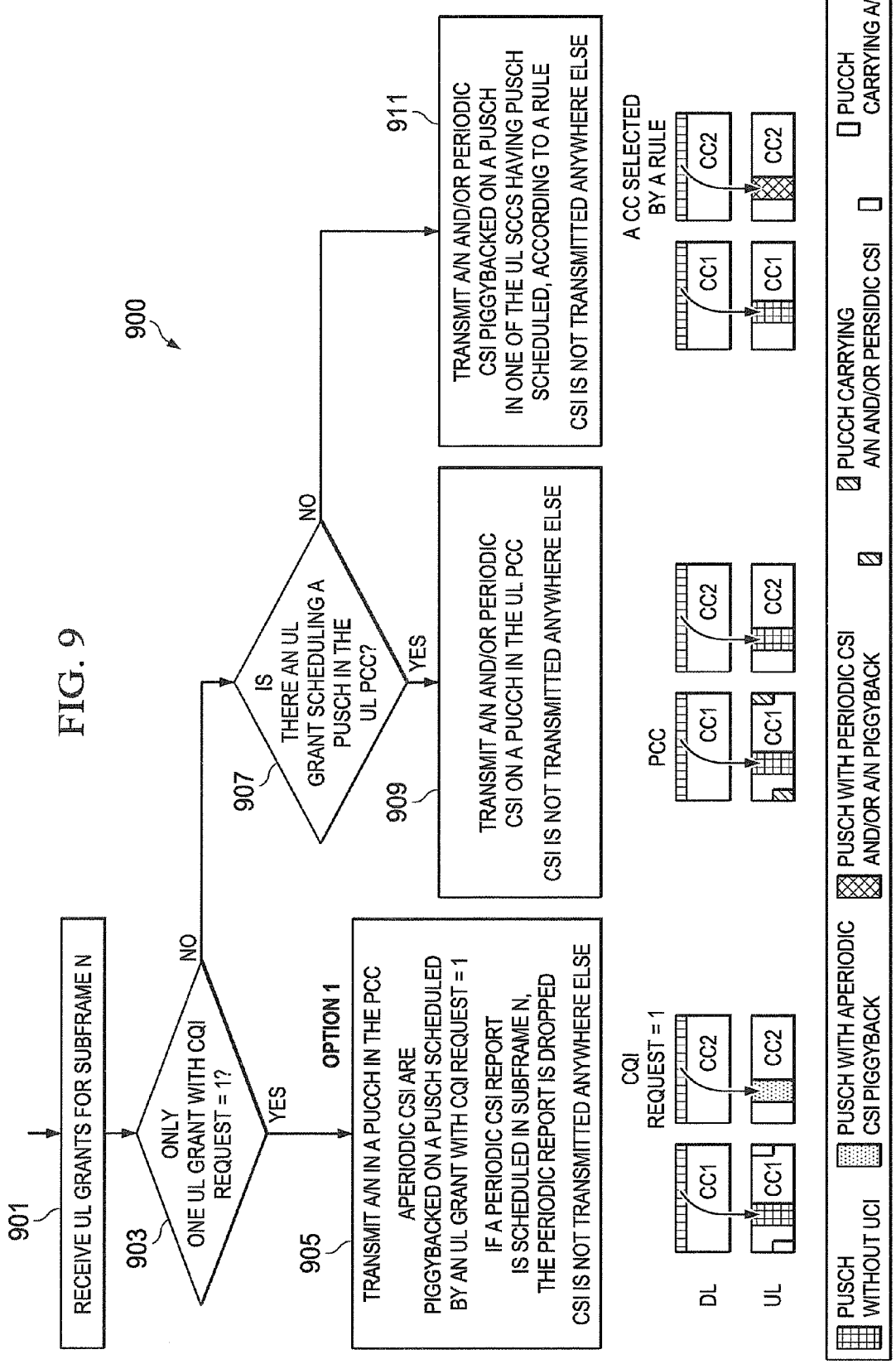
FIG. 9 illustrates a method of operating a user equipment or subscriber station according to yet another embodiment of this disclosure.

FIG. 9 illustrates a method 900 of operating a user equipment or subscriber station according to yet another embodiment of this disclosure.

As shown in FIG. 9, a UE receives one or more UL grants scheduling the PUSCH in the UL CC i for subframe n (block 901). The UE determines if only one of the UL grants for subframe n has a CQI-request with a particular value, such as 1, 01, 10, or 11 (block 903). If the UE determines that only one of the UL grants have a CQI-request with the particular value, the UE piggybacks an aperiodic CSI report on a PUSCH scheduled by an UL grant with a CQI-request with the particular value, and transmits A/N in a PUCCH in the PCC (block 905). If a periodic CSI report is scheduled in the same subframe as the aperiodic CSI report, the UE drops the periodic CSI report. CSI is not transmitted any where else.

If the UE determines that none of the UL grants have a CQI-request with the particular value, the UE determines if an UL grant scheduling a PUSCH in the UL PCC has been received (block 907). If an UL grant scheduling a PUSCH in the UL PCC has been received, the UE transmits A/N and/or a periodic CSI report on a PUCCH in the UL PCC (block 909). CSI is not transmitted any where else.

If an UL grant scheduling a PUSCH in the UL PCC has not been received, the UE piggybacks A/N and/or a periodic CSI report on a PUSCH in one of the UL SCCs having PUSCH scheduled, where the SCC is selected according to a rule, e.g., highest MCS, smallest UL CC number, smallest carrier frequency UL CC, etc. (block 911). CSI is not transmitted any where else.

Figure 10:
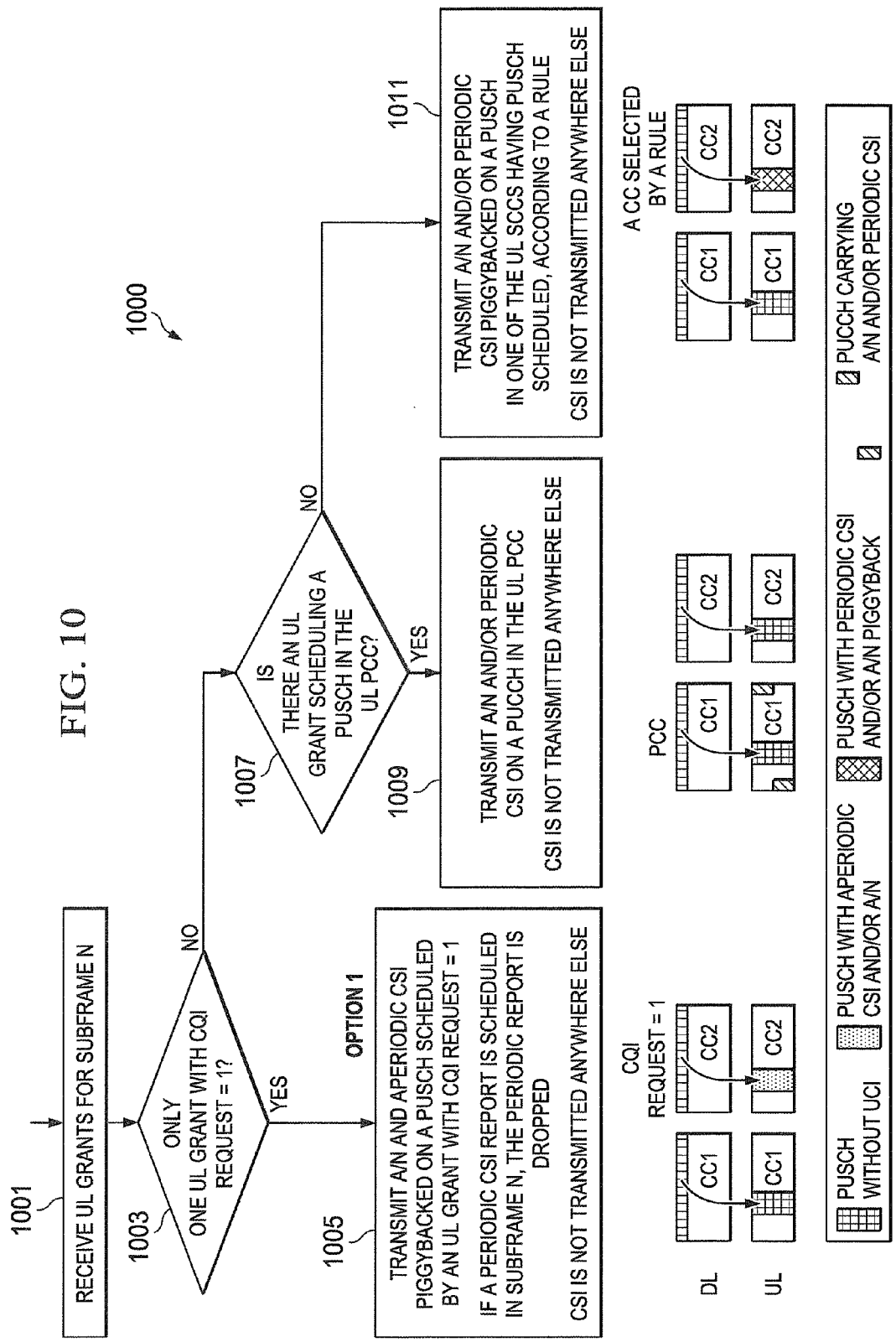
FIG. 10 illustrates a method of operating a user equipment or subscriber station according to a further embodiment of this disclosure

FIG. 10 illustrates a method 1000 of operating a user equipment or subscriber station according to a further embodiment of this disclosure.

As shown in FIG. 10, a UE receives one or more UL grants scheduling the PUSCH in the UL CC i for subframe n (block 1001). The UE determines if only one of the UL grants for subframe n have a CQI-request with a particular value, such as 1, 01, 10, or 11 (block 1003). If the UE determines that only one of the UL grants have a CQI-request with the particular value, the UE piggybacks A/N and aperiodic CSI report on a PUSCH scheduled by an UL grant with a CQI-request with the particular value (block 1005). If a periodic CSI report is scheduled in the same subframe as the aperiodic CSI report, the UE drops the periodic CSI report. CSI is not transmitted any where else.

If the UE determines that none of the UL grants have a CQI-request with the particular value, the UE determines if an UL grant scheduling a PUSCH in the UL PCC has been received (block 1007). If an UL grant scheduling a PUSCH in the UL PCC has been received, the UE transmits A/N and/or a periodic CSI report on a PUCCH in the UL PCC (block 1009). CSI is not transmitted any where else.

If an UL grant scheduling a PUSCH in the UL PCC has not been received, the UE piggybacks A/N and/or a periodic CSI report on a PUSCH in one of the UL SCCs having PUSCH scheduled, where the SCC is selected according to a rule, e.g., highest MCS, smallest UL CC number, smallest carrier frequency UL CC, etc. (block 1011). CSI is not transmitted any where else.

An embodiment is considered where method 3 is indicated by the RRC signaling. If the PCC has an UL grant, CSI or UCI is separately transmitted in the PUCCH and only UL-SCH data is transmitted in a PUSCH in the PCC. Otherwise, CSI or UCI is piggybacked on one of the PUSCHs transmitted in the SCCs. If the UE receives an UL grant with CQI request=1 scheduling a PUSCH and an aperiodic CSI report in the UL PCC in a subframe, the UE transmits A/N in the PUCCH in the UL PCC. If the UE receives an UL grant with CQI request=1 scheduling a PUSCH and an aperiodic CSI report in an UL SCC in a subframe, the UE piggybacks A/N in the PUSCH in the UL SCC. If the UE does not receive any UL grants with CQI request=1 but receives an UL grant scheduling the PUSCH in the UL PCC, the UE transmits CSI or UCI in the PUCCH in the UL PCC. If the UE receives neither any UL grants with CQI request=1 nor an UL grant scheduling a PUSCH in the UL PCC, the UE piggybacks CSI in the PUSCH in one of the UL SCCs to carry the PUSCH in the subframe according to a rule.

Figure 11:
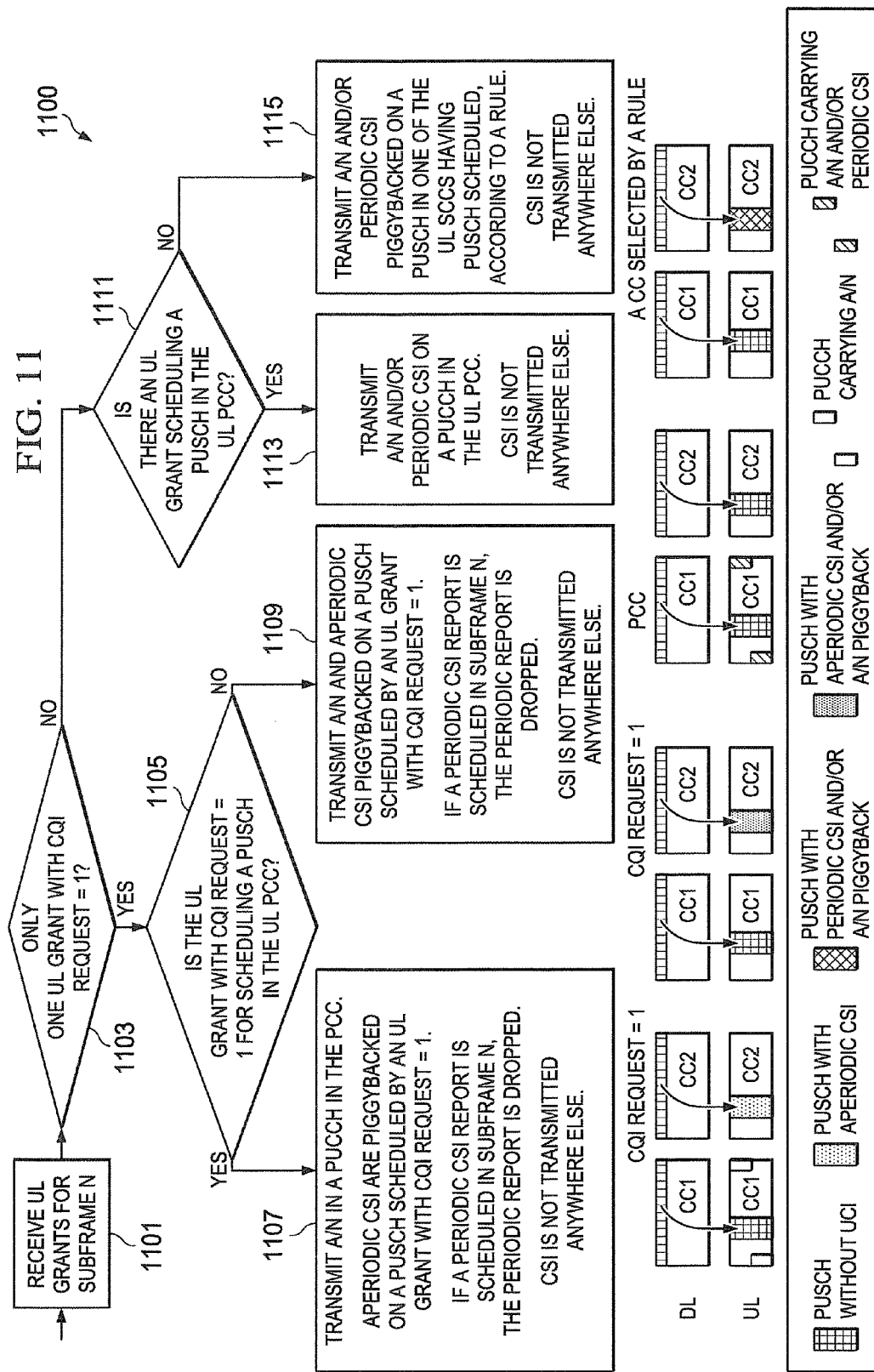
FIG. 11 illustrates a method of operating a user equipment or subscriber station according to yet a further embodiment of this disclosure.

FIG. 11 illustrates a method 1100 of operating a user equipment or subscriber station according to yet a further embodiment of this disclosure.

As shown in FIG. 11, a UE receives one or more UL grants scheduling the PUSCH in the UL CC i for subframe n (block 1101). The UE determines if only one of the UL grants for subframe n have a CQI-request with a particular value, such as 1, 01, 10, or 11 (block 1103). If the UE determines that only one of the UL grants have a CQI-request with the particular value, the UE determines if the UL grant with a CQI-request having the particular value is for scheduling a PUSCH in the UL PCC (block 1105).

If the UL grant with a CQI-request having the particular value is for scheduling a PUSCH in the UL PCC (block 1105), the UE piggybacks an aperiodic CSI report on a PUSCH scheduled by an UL grant with a CQI-request with the particular value, and transmits A/N in a PUCCH in the PCC (block 1107). If a periodic CSI report is scheduled in the same subframe as the aperiodic CSI report, the UE drops the periodic CSI report. CSI is not transmitted any where else.

If there are no UL grants with a CQI-request having the particular value are for scheduling a PUSCH in the UL PCC (block 1105), the UE piggybacks A/N and an aperiodic CSI report on a PUSCH scheduled by an UL grant with a CQI-request with the particular value (block 1109). If a periodic CSI report is scheduled in the same subframe as the aperiodic CSI report, the UE drops the periodic CSI report. CSI is not transmitted any where else.

If none of the UL grants for subframe n have a CQI-request with the particular value, the UE determines if an UL grant scheduling a PUSCH in the UL PCC has been received (block 1111). If an UL grant scheduling a PUSCH in the UL PCC has been received, the UE transmits A/N and/or a periodic CSI report on a PUCCH in the UL PCC (block 1113). CSI is not transmitted any where else.

If an UL grant scheduling a PUSCH in the UL PCC has not been received, the UE piggybacks A/N and/or a periodic CSI report on a PUSCH in one of the UL SCCs having PUSCH scheduled, where the SCC is selected according to a rule, e.g., highest MCS, smallest UL CC number, smallest carrier frequency UL CC, etc. (block 1115). CSI is not transmitted any where else.

In embodiments of this disclosure, a UE piggybacks A/N on the PUSCH where an aperiodic CSI report is transmitted whenever there is an UL grant with CQI request=1, regardless of whether UCIPiggybackConfiguration IE is RRC-signalled or not.

Figure 12:
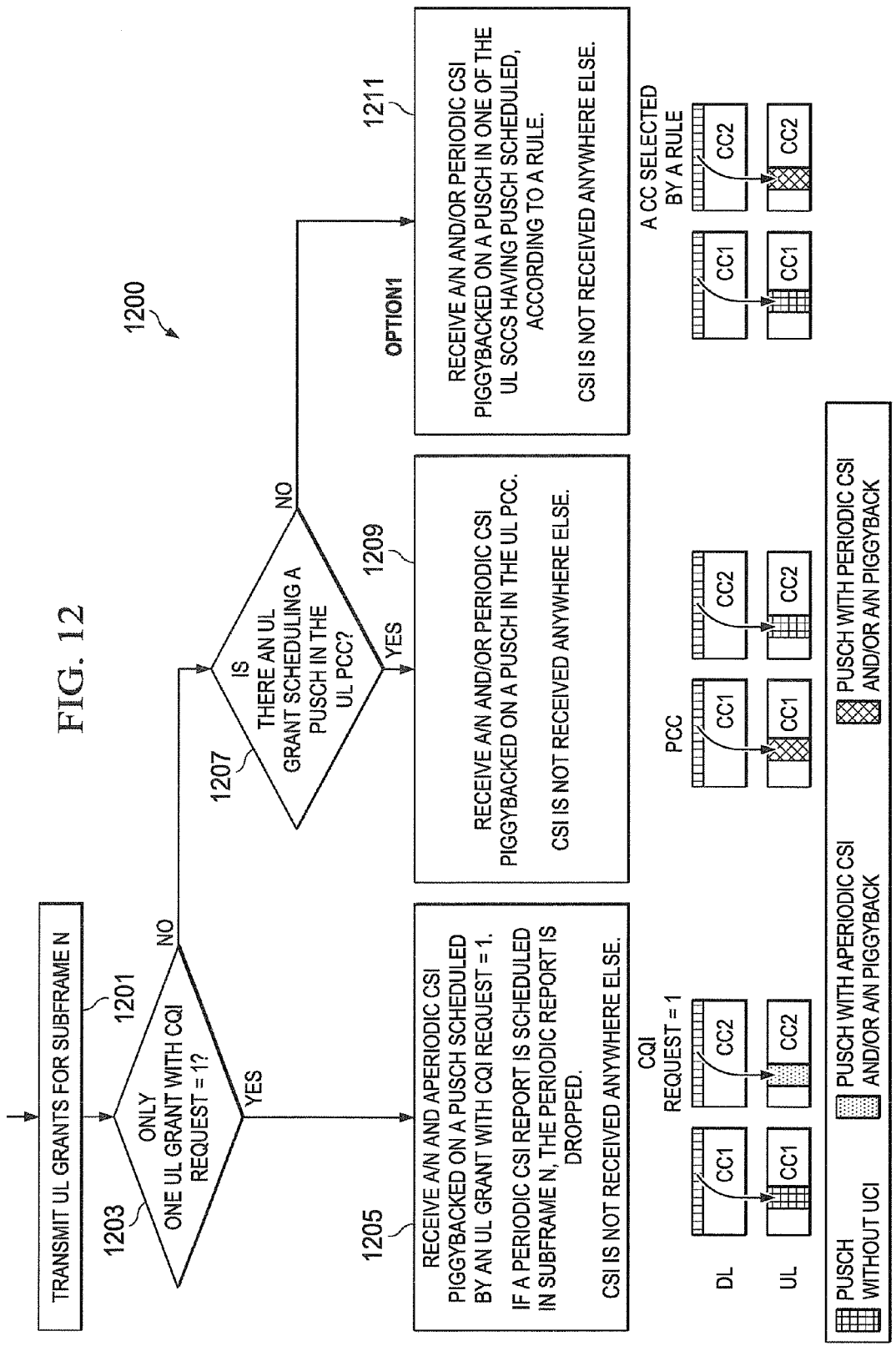
FIG. 12 illustrates a method of operating an eNodeB or base station according to an embodiment of this disclosure.

FIG. 12 illustrates a method 1200 of operating an eNodeB or base station according to an embodiment of this disclosure.

As shown in FIG. 12, a base station selects one of a first uplink control information (UCI) multiplexing method that allows a subscriber station to simultaneously transmit physical uplink shared channel (PUSCH) and physical uplink control channel (PUCCH) and a second UCI multiplexing method that does not allow the subscriber station to simultaneously transmit PUSCH and PUCCH, transmits a higher layer signal indicating the one selected UCI multiplexing method to the subscriber station, and transmits one or more uplink grants to the subscriber station (block 1201). Each of the one or more uplink grants schedules a PUSCH in an uplink component carrier (UL CC) for a subframe n to the subscriber station, and each of the one or more uplink grants carries a channel quality information (CQI) request.

If only one UL grant of the one or more uplink grants for subframe n has a CQI-request with a particular value, such as 1, 01, 10, or 11 (block 1203), the base station receives A/N piggybacked with an aperiodic CSI report transmitted in the PUSCH in UL CC i by the subscriber station (block 1205).

If the UL grant does not have a CQI-request with the particular value, and if an UL grant scheduling a PUSCH in the UL PCC has been transmitted by the base station to the subscriber station (block 1207), the base station receives A/N and/or a periodic CSI report piggybacked on the PUSCH in the PCC from the subscriber station (block 1209).

If the UL grant does not have a CQI-request with the particular value, and if an UL grant scheduling a PUSCH in the UL PCC has not been transmitted by the base station to the subscriber station (block 1207), the base station receives A/N and/or a periodic CSI report piggybacked on a PUSCH in one of the UL SCCs having PUSCH scheduled from the subscriber station, where the SCC is selected according to a rule, e.g., highest MCS, smallest UL CC number, smallest carrier frequency UL CC, etc. (block 1211).

FIG. 13 illustrates a method 1300 of operating an eNodeB or base station according to another embodiment of this disclosure.

As shown in FIG. 13, a base station selects one of a first uplink control information (UCI) multiplexing method that allows a subscriber station to simultaneously transmit physical uplink shared channel (PUSCH) and physical uplink control channel (PUCCH) and a second UCI multiplexing method that does not allow the subscriber station to simultaneously transmit PUSCH and PUCCH, transmits a higher layer signal indicating the one selected UCI multiplexing method to the subscriber station, and transmits one or more uplink grants to the subscriber station (block 1301). Each of the one or more uplink grants schedules a PUSCH in an uplink component carrier (UL CC) for a subframe n to the subscriber station, and each of the one or more uplink grants carries a channel quality information (CQI) request.

If only one UL grant of the one or more uplink grants for subframe n has a CQI-request with a particular value, such as 1, 01, 10, or 11 (block 1303), the base station receives A/N and an aperiodic CSI report piggybacked on a PUSCH scheduled by the UL grant from the subscriber station (block 1305).

If the UL grant does not have a CQI-request with the particular value, and if an UL grant scheduling a PUSCH in the UL PCC has been transmitted by the base station (block 1307), the base station receives A/N and/or a periodic CSI report on a PUSCH in the UL PCC from the subscriber station (block 1309).

If the UL grant does not have a CQI-request with the particular value, and if an UL grant scheduling a PUSCH in the UL PCC has not been transmitted by the base station (block 1307), the base station receives A/N and/or a periodic CSI report piggybacked on a PUSCH in one of the UL SCCs having PUSCH scheduled from the subscriber station, where the SCC is selected according to a rule, e.g., highest MCS, smallest UL CC number, smallest carrier frequency UL CC, etc. (block 1311).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
a transmit path circuitry configured to:
select one of a first uplink control information (UCI) multiplexing method that allows a subscriber station to simultaneously transmit physical uplink shared channel (PUSCH) and physical uplink control channel (PUCCH) and a second UCI multiplexing method that does not allow the subscriber station to simultaneously transmit PUSCH and PUCCH;
transmit a higher layer signal indicating the one selected UCI multiplexing method to the subscriber station; and
transmit one or more uplink grants to the subscriber station, wherein each of the one or more uplink grants schedules a PUSCH in an uplink component carrier (UL CC) for a subframe n to the subscriber station, and each of the one or more uplink grants carries a channel quality information (CQI) request; and
a receive path circuitry configured to receive an aperiodic channel state information (CSI) report transmitted by the subscriber station on the PUSCH in the uplink component carrier i when only one uplink grant of the one or more uplink grants scheduling a PUSCH in an uplink component carrier i carries a CQI request having a value from a set of values,
wherein when acknowledgement/negative acknowledgement (ACK/NACK) information is scheduled in the same subframe n and when the one selected UCI multiplexing method is the first UCI multiplexing method, the ACK/NACK information is also transmitted by the subscriber station on the PUSCH transmitted in the uplink component carrier i.

2. The base station in accordance with claim 1, wherein when the one selected UCI multiplexing method is the first UCI multiplexing method, when none of the one or more uplink grants scheduling a PUSCH in an uplink component carrier i carries a CQI request having a value from the set of values, and when at least one of the one or more uplink grants schedules the PUSCH in an uplink primary component carrier (UL PCC), the receive path circuitry is configured to receive at least one of ACK/NACK information and a periodic CSI report from the subscriber station on the PUSCH in the UL PCC when the subscriber station is scheduled to transmit the at least one of ACK/NACK information and a periodic CSI report.

3. The base station in accordance with claim 1, wherein when the aperiodic CSI report is scheduled in a same subframe n as a periodic CSI report, the receive path circuitry is configured to receive only the aperiodic CSI report.

4. The station in accordance with claim 1, wherein when the one selected UCI multiplexing method is the second UCI multiplexing method, when none of the one or more uplink grants scheduling a PUSCH in an uplink component carrier i carries a CQI request having a value from the set of values, and when at least one of the one or more uplink grants schedules the PUSCH in an uplink primary component carrier (UL PCC), the receive path circuitry is configured to receive at least one of ACK/NACK information and a periodic CSI report from the subscriber station on the PUCCH in the UL PCC when the subscriber station is scheduled to transmit the at least one of ACK/NACK information and a periodic CSI report.

5. The base station in accordance with claim 1, wherein when none of the one or more uplink grants scheduling a PUSCH in an uplink component carrier i carries a CQI request having a value from the set of values, when at least one of the one or more uplink grants schedules the PUSCH in an uplink secondary component carrier (UL SCC), and when none of the one or more uplink grants schedules the PUSCH in an uplink primary component carrier (UL PCC), the receive path circuitry is configured to receive at least one of ACK/NACK information and a periodic CSI report from the subscriber station on the PUSCH in an UL SCC having a smallest UL CC number when the subscriber station is scheduled to transmit the at least one of ACK/NACK information and the periodic CSI report.

6. The base station in accordance with claim 1, wherein the set of values includes '1', '01', '10', and '11'.

7. The station in accordance with claim 1, wherein when only one uplink grant of the one or more uplink grants scheduling a PUSCH in an uplink component carrier i carries a CQI request having a value from the set of values and when the one selected UCI multiplexing method is the second UCI multiplexing method, the receive path circuitry is configured to receive ACK/NACK information in a PUCCH in a primary component carrier (PCC).

8. The base station in accordance with claim 1, wherein when only one uplink grant of the one or more uplink grants scheduling a PUSCH in an uplink component carrier i carries a CQI request having a value from the set of values and when the one selected UCI multiplexing method is the second UCI multiplexing method, the receive path circuitry configured to receive the aperiodic CSI report and ACK/NACK information on the PUSCH transmitted in the uplink component carrier i.

9. A method of operating a base station, the method comprising:
selecting one of a first uplink control information (UCI) multiplexing method that allows a subscriber station to simultaneously transmit physical uplink shared channel (PUSCH) and physical uplink control channel (PUCCH) and a second UCI multiplexing method that does not allow the subscriber station to simultaneously transmit PUSCH and PUCCH;

transmitting a higher layer signal indicating the one selected UCI multiplexing method to the subscriber station;

transmitting one or more uplink grants to the subscriber station, wherein each of the one or more uplink grants schedules a PUSCH in an uplink component carrier (UL CC) for a subframe n to the subscriber station, and each of the one or more uplink grants carries a channel quality information (CQI) request; and receiving an aperiodic channel state information (CSI) report on the PUSCH transmitted by the subscriber station in the uplink component carrier i when only one uplink grant of the one or more uplink grants scheduling a PUSCH in an uplink component carrier i carries a CQI request having a value from a set of values, wherein when acknowledgement/negative acknowledgement (ACK/NACK) information is scheduled in the same subframe n and when the one selected UCI multiplexing method is the first UCI multiplexing method, the ACK/NACK information is also transmitted by the subscriber station on the PUSCH transmitted in the uplink component carrier i.

10. The method in accordance with claim 9 further comprising:

when the one selected UCI multiplexing method is the first UCI multiplexing method, when none of the one or more uplink grants scheduling a PUSCH in an uplink component carrier i carries a CQI request having a value from the set of values, and when at least one of the one or more uplink grants schedules the PUSCH in an uplink primary component carrier (UL PCC), receiving at least one of ACK/NACK information and a periodic CSI report from the subscriber station on the PUSCH in the UL PCC when the subscriber station is scheduled to transmit the at least one of ACK/NACK information and the periodic CSI report.

11. The method in accordance with claim 9, wherein when the aperiodic CSI report is scheduled in a same subframe n as a periodic CSI report, only the aperiodic CSI report is received.

12. The method in accordance with claim 9 further comprising:

when the one selected UCI multiplexing method is the second UCI multiplexing method, when none of the one or more uplink grants scheduling a PUSCH in an uplink component carrier i carries a CQI request having a value from the set of values, and when at least one of the one or more uplink grants schedules the PUSCH in an uplink primary component carrier (UL PCC), receiving at least one of ACK/NACK information and a periodic CSI report from the subscriber station on the PUCCH in the UL PCC when the subscriber station is scheduled to transmit the at least one of ACK/NACK information and a periodic CSI report.

13. The method in accordance with claim 9 further comprising:

when none of the one or more uplink grants scheduling a PUSCH in an uplink component carrier i carries a CQI request having a value from the set of values, when at least one of the one or more uplink grants schedules the PUSCH in an uplink secondary component carrier (UL SCC), and when none of the one or more uplink grants schedules the PUSCH in an uplink primary component carrier (UL PCC), receiving at least one of ACK/NACK information and a periodic CSI report from the subscriber station on the PUSCH in an uplink secondary component carrier (UL SCC) having a smallest UL CC number when the subscriber station is scheduled to transmit the at least one of ACK/NACK information and a periodic CSI report.

14. The method in accordance with claim 9, wherein the set of values includes '1', '01', '10', and '11'.

15. The method in accordance with claim 9, further comprising:

when only one uplink grant of the one or more uplink grants scheduling a PUSCH in an uplink component carrier i carries a CQI request having a value from the set of values and when the one selected UCI multiplexing method is the second UCI multiplexing method, receiving ACK/NACK information in a PUCCH in a primary component carrier (PCC).

16. The method in accordance with claim 9, further comprising:

when only one uplink grant of the one or more uplink grants scheduling a PUSCH in an uplink component carrier i carries a CQI request having a value from the set of values and when the one selected UCI multiplexing method is the second UCI multiplexing method, receiving the aperiodic CSI report and ACK/NACK information on the PUSCH transmitted in the uplink component carrier i.

17. A subscriber station comprising:

a receive path circuitry configured to receive:
a higher layer signal from a base station indicating one of a first uplink control information (UCI) multiplexing method that allows a subscriber station to simultaneously transmit physical uplink shared channel (PUSCH) and physical uplink control channel (PUCCH) and a second UCI multiplexing method that does not allow the subscriber station to simultaneously transmit PUSCH and PUCCH; and one or more uplink grants from the base station, wherein each of the one or more uplink grants schedules a physical uplink shared channel (PUSCH) in an uplink component carrier (UL CC) for a subframe n to the subscriber station, and each of the one or more uplink grants carries a channel quality information (CQI) request; and a transmit path circuitry configured to transmit an aperiodic channel state information (CSI) report to the base station on the PUSCH in the uplink component carrier i when only one uplink grant of the one or more uplink grants scheduling a PUSCH in an uplink component carrier i carries a CQI request having a value from a set of values, wherein when acknowledgement/negative acknowledgement (ACK/NACK) information is scheduled in the same subframe n and when the one selected UCI multiplexing method is the first UCI multiplexing method, the ACK/NACK information is also transmitted to the base station on the PUSCH transmitted in the uplink component carrier i.

18. The subscriber station in accordance with claim 17, wherein when the one selected UCI multiplexing method is the first UCI multiplexing method, when none of the one or more uplink grants scheduling a PUSCH in an uplink component carrier i carries a CQI request having a value from the set of values, and when at least one of the one or more uplink grants schedules the PUSCH in an uplink primary component carrier (UL PCC), the transmit path circuitry is configured to transmit at least one of ACK/NACK information and a periodic CSI report to the base station on the PUSCH in the UL PCC when the subscriber station is scheduled to transmit the at least one of ACK/NACK information and the periodic CSI report.

19. The subscriber station in accordance with claim 17, wherein when the aperiodic CSI report is scheduled in a same subframe n as a periodic CSI report, the transmit path circuitry is configured to transmit only the aperiodic CSI report.

20. The subscriber station in accordance with claim 17, wherein when the one selected UCI multiplexing method is the second UCI multiplexing method, when none of the one or more uplink grants scheduling a PUSCH in an uplink component carrier i carries a CQI request having a value from the set of values, and when at least one of the one or more uplink grants schedules the PUSCH in an uplink primary component carrier (UL PCC), the transmit path circuitry is configured to transmit at least one of ACK/NACK information and a periodic CSI report to the base station on the PUCCH in the UL PCC when the subscriber station is scheduled to transmit the at least one of ACK/NACK information and the periodic CSI report.

21. The subscriber station in accordance with claim 17, wherein when none of the one or more uplink grants scheduling a PUSCH in an uplink component carrier i carries a CQI request having a value from the set of values, when at least one of the one or more uplink grants schedules the PUSCH in an uplink secondary component carrier (UL SCC), and when none of the one or more uplink grants schedules the PUSCH in an uplink primary component carrier (UL PCC), the transmit path circuitry is configured to transmit at least one of ACK/NACK information and a periodic CSI report to the base station on the PUSCH in an UL SCC having a smallest UL CC number when the subscriber station is scheduled to transmit the at least one of ACK/NACK information and the periodic CSI report.

22. The subscriber station in accordance with claim 17, wherein the set of values includes '1', '01', '10', and '11'.

23. The subscriber station in accordance with claim 17, wherein when only one uplink grant of the one or more uplink grants scheduling a PUSCH in an uplink component carrier i carries a CQI request having a value from the set of values and when the one selected UCI multiplexing method is the second UCI multiplexing method, the transmit path circuitry is configured to transmit ACK/NACK information in a PUCCH in a primary component carrier (PCC).

24. The subscriber station in accordance with claim 17, wherein when only one uplink grant of the one or more uplink grants scheduling a PUSCH in an uplink component carrier i carries a CQI request having a value from the set of values and when the one selected UCI multiplexing method is the second UCI multiplexing method, the transmit path circuitry configured to transmit the aperiodic CSI report and ACK/NACK information on the PUSCH transmitted in the uplink component carrier i.

25. A method of operating a subscriber station, the method comprising:
receiving a higher layer signal from a base station indicating one of a first uplink control information (UCI) multiplexing method that allows the subscriber station to simultaneously transmit physical uplink shared channel (PUSCH) and physical uplink control channel (PUCCH) and a second UCI multiplexing method that does not allow the subscriber station to simultaneously transmit PUSCH and PUCCH;
receiving one or more uplink grants from the base station, wherein each of the one or more uplink grants schedules a physical uplink shared channel (PUSCH) in an uplink component carrier (UL CC) for a subframe n to the subscriber station, and each of the one or more uplink grants carries a channel quality information (CQI) request; and
transmitting an aperiodic channel state information (CSI) report on the PUSCH to the base station in the uplink component carrier i when only one uplink grant of the one or more uplink grants scheduling a PUSCH in an uplink component carrier i carries a CQI request having a value from a set of values,
wherein when acknowledgement/negative acknowledgement (ACK/NACK) information is scheduled in the same subframe n and when the one selected UCI multiplexing method is the first UCI multiplexing method, the ACK/NACK information is also transmitted by the subscriber station on the PUSCH transmitted in the uplink component carrier i.

26. The method in accordance with claim 25 further comprising:
when the one selected UCI multiplexing method is the first UCI multiplexing method, when none of the one or more uplink grants scheduling a PUSCH in an uplink component carrier i carries a CQI request having a value from the set of values, and when at least one of the one or more uplink grants schedules the PUSCH in an uplink primary component carrier (UL PCC), transmitting at least one of ACK/NACK information and a periodic CSI report to the base station on the PUSCH in the UL PCC when the subscriber station is scheduled to transmit the at least one of ACK/NACK information and a periodic CSI report.

27. The method in accordance with claim 25, wherein when the aperiodic CSI report is scheduled in a same subframe n as a periodic CSI report, only the aperiodic CSI report is transmitted.

28. The method in accordance with claim 25 further comprising:
when the one selected UCI multiplexing method is the second UCI multiplexing method, when none of the one or more uplink grants scheduling a PUSCH in an uplink component carrier i carries a CQI request having a value from the set of values, and when at least one of the one or more uplink grants schedules the PUCCH in an uplink primary component carrier (UL PCC), transmitting at least one of ACK/NACK information and a periodic CSI report to the base station on the PUSCH in the UL PCC when the subscriber station is scheduled to transmit the at least one of ACK/NACK information and a periodic CSI report.

29. The method in accordance with claim 25 further comprising:
when none of the one or more uplink grants scheduling a PUSCH in an uplink component carrier i carries a CQI request having a value from the set of values, when at least one of the one or more uplink grants schedules the PUSCH in an uplink secondary component carrier (UL SCC), and when none of the one or more uplink grants schedules the PUSCH in an uplink primary component carrier (UL PCC), transmitting at least one of ACK/NACK information and a periodic CSI report to the base station on the PUSCH in an UL SCC having a smallest UL CC number when the subscriber station is scheduled to transmit the at least one of ACK/NACK information and the periodic CSI report.

30. The method in accordance with claim 25, wherein the set of values includes '1', '01', '10', and '11'.

31. The method in accordance with claim 25, further comprising:
   when only one uplink grant of the one or more uplink grants scheduling a PUSCH in an uplink component carrier i carries a CQI request having a value from the set of values and when the one selected UCI multiplexing method is the second UCI multiplexing method, transmitting ACK/NACK information in a PUCCH in a primary component carrier (PCC).

32. The method in accordance with claim 25, further comprising:
   when only one uplink grant of the one or more uplink grants scheduling a PUSCH in an uplink component carrier i carries a CQI request having a value from the set of values and when the one selected UCI multiplexing method is the second UCI multiplexing method, transmitting the aperiodic CSI report and ACK/NACK information on the PUSCH transmitted in the uplink component carrier i.

* * * * *